United States Patent
Zhang et al.

(10) Patent No.: US 10,309,777 B2
(45) Date of Patent: Jun. 4, 2019

(54) VISUAL ODOMETRY AND PAIRWISE ALIGNMENT FOR HIGH DEFINITION MAP CREATION

(71) Applicant: DeepMap Inc., Palo Alto, CA (US)

(72) Inventors: Ronghua Zhang, Campbell, CA (US); Chen Chen, San Jose, CA (US); Di Zeng, Sunnyvale, CA (US); Mark Damon Wheeler, Saratoga, CA (US)

(73) Assignee: DEEPMAP INC., Grand Caymen (KY)

( * ) Notice: Subject to any disclaimer, the term of this patent is extended or adjusted under 35 U.S.C. 154(b) by 0 days.

(21) Appl. No.: 15/855,116

(22) Filed: Dec. 27, 2017

(65) Prior Publication Data

US 2018/0188026 A1    Jul. 5, 2018

Related U.S. Application Data

(60) Provisional application No. 62/441,080, filed on Dec. 30, 2016.

(51) Int. Cl.
*G06K 9/00* (2006.01)
*G01C 11/12* (2006.01)
(Continued)

(52) U.S. Cl.
CPC .............. *G01C 11/12* (2013.01); *B60W 40/06* (2013.01); *G01C 11/30* (2013.01); *G01C 21/005* (2013.01); *G01C 21/32* (2013.01); *G01C 21/3635* (2013.01); *G01C 21/3694* (2013.01); *G01S 19/42* (2013.01); *G05D 1/0088* (2013.01); *G05D 1/0246* (2013.01); *G06K 9/00791* (2013.01); *G06K 9/00798* (2013.01); *G06K 9/00805* (2013.01); *G06K 9/4671* (2013.01); *G06K 9/6212* (2013.01); *G06T 7/11* (2017.01); *G06T 7/246* (2017.01); *G06T 7/248* (2017.01); *G06T 7/55* (2017.01); *G06T 7/593* (2017.01); *G06T 7/68* (2017.01); *G06T 7/70* (2017.01); *G06T 7/73* (2017.01); *G06T 7/74* (2017.01);
(Continued)

(58) Field of Classification Search
CPC ...... G06K 9/00798; G06T 2207/30256; G05D 1/0088; G05D 2201/0213; G01C 21/32
USPC ........................................................ 382/103
See application file for complete search history.

(56) References Cited

U.S. PATENT DOCUMENTS

7,298,869 B1    11/2007 Abernathy
8,527,199 B1    9/2013 Burnette et al.
(Continued)

OTHER PUBLICATIONS

PCT International Search Report and Written Opinion, PCT Application No. PCT/US17/68597, dated Mar. 15, 2018, 28 pages.

*Primary Examiner* — Charlotte M Baker
(74) *Attorney, Agent, or Firm* — Fenwick & West LLP

(57) ABSTRACT

As an autonomous vehicle moves through a local area, pairwise alignment may be performed to calculate changes in the pose of the vehicle between different points in time. The vehicle comprises an imaging system configured to capture image frames depicting a portion of the surrounding area. Features are identified from the captured image frames, and a 3-D location is determined for each identified feature. The features of different image frames corresponding to different points in time are analyzed to determine a transformation in the pose of the vehicle during the time period between the image frames. The determined poses of the vehicle are used to generate an HD map of the local area.

20 Claims, 16 Drawing Sheets

(51) Int. Cl.

| | | |
|---|---|---|
| *G06T 7/73* | (2017.01) | |
| *G06T 7/68* | (2017.01) | |
| *G06T 7/55* | (2017.01) | |
| *G06T 17/05* | (2011.01) | |
| *G01C 11/30* | (2006.01) | |
| *G06T 7/246* | (2017.01) | |
| *G06T 7/11* | (2017.01) | |
| *G01C 21/32* | (2006.01) | |
| *G01C 21/36* | (2006.01) | |
| *G05D 1/00* | (2006.01) | |
| *G05D 1/02* | (2006.01) | |
| *G06T 7/70* | (2017.01) | |
| *G06T 7/593* | (2017.01) | |
| *G06K 9/62* | (2006.01) | |
| *B60W 40/06* | (2012.01) | |
| *G01S 19/42* | (2010.01) | |
| *G08G 1/00* | (2006.01) | |
| *G06T 17/20* | (2006.01) | |
| *G01C 21/00* | (2006.01) | |
| *G06K 9/46* | (2006.01) | |
| *G01S 17/89* | (2006.01) | |

(52) U.S. Cl.
CPC .............. *G06T 17/05* (2013.01); *G06T 17/20* (2013.01); *G08G 1/20* (2013.01); *B60W 2550/14* (2013.01); *G01S 17/89* (2013.01); *G05D 2201/0213* (2013.01); *G06T 2200/04* (2013.01); *G06T 2207/10021* (2013.01); *G06T 2207/10028* (2013.01); *G06T 2207/20048* (2013.01); *G06T 2207/30252* (2013.01); *G06T 2207/30256* (2013.01); *G06T 2210/56* (2013.01); *G06T 2215/12* (2013.01)

(56) References Cited

U.S. PATENT DOCUMENTS

| | | | |
|---|---|---|---|
| 9,357,208 B2 * | 5/2016 | Gupta | .................... H04N 17/00 |
| 2009/0140887 A1 | 6/2009 | Breed et al. | |
| 2014/0236463 A1 | 8/2014 | Zhang et al. | |
| 2014/0340489 A1 | 11/2014 | Medioni et al. | |
| 2016/0092755 A1 | 3/2016 | Fairfield et al. | |
| 2016/0291154 A1 | 10/2016 | Nehmadi et al. | |

\* cited by examiner

VISUAL ODOMETRY AND PAIRWISE ALIGNMENT FOR HIGH DEFINITION MAP CREATION

CROSS-REFERENCE TO RELATED APPLICATIONS

This application claims the benefit of U.S. Provisional Patent Application No. 62/441,080, filed on Dec. 30, 2016, which is hereby incorporated by reference in its entirety.

BACKGROUND

This disclosure relates generally to maps for self-driving autonomous vehicles, and more particularly to providing high definition maps with most up to date and improved precision to self-driving vehicles with which the self-driving vehicles can safely navigate to their destinations with limited human interaction or monitoring or without any human input.

Autonomous vehicles, also known as self-driving cars, driverless cars, auto, or robotic cars, drive from a source location to a destination location without requiring a human driver to control and navigate the vehicle. Automation of driving is difficult due to several reasons. For example, autonomous vehicles use sensors to make driving decisions on the fly, but vehicle sensors cannot observe everything all the time. Vehicle sensors can be obscured by corners, rolling hills, and other vehicles. Vehicles sensors may not observe certain things early enough to make decisions. In addition, lanes and signs may be missing on the road or knocked over or hidden by bushes, and therefore not detectable by sensors. Furthermore, road signs for rights of way may not be readily visible for determining from where vehicles could be coming, or for swerving or moving out of a lane in an emergency or when there is a stopped obstacle that must be passed.

Autonomous vehicles can use map data to figure out some of the above information instead of relying on sensor data. However conventional maps have several drawbacks that make them difficult to use for an autonomous vehicle. For example maps do not provide the level of accuracy required for safe navigation (e.g., 10 cm or less). GPS systems provide accuracies of approximately 3-5 meters, but have large error conditions resulting in an accuracy of over 100 m. This makes it challenging to accurately determine the location of the vehicle.

Furthermore, conventional maps are created by survey teams that use drivers with specially outfitted cars with high resolution sensors that drive around a geographic region and take measurements. The measurements are taken back and a team of map editors assembles the map from the measurements. This process is expensive and time consuming (e.g., taking possibly months to complete a map). Therefore, maps assembled using such techniques do not have fresh data. For example, roads are updated/modified on a frequent basis roughly 5-10% per year. But survey cars are expensive and limited in number, so cannot capture most of these updates. For example, a survey fleet may include a thousand cars. For even a single state in the United States, a thousand cars would not be able to keep the map up-to-date on a regular basis to allow safe self-driving. As a result, conventional techniques of maintaining maps are unable to provide the right data that is sufficiently accurate and up-to-date for safe navigation of autonomous vehicles.

SUMMARY

HD maps may be used to aid in the guidance of autonomous vehicles. In some cases, an HD map of a local area is generated based upon sensor readings gathered via sensor systems on a large number of vehicles traveling through the local area. For example, features of the local area detected by the sensors of different vehicles may be correlated to generate an HD model of the features. However, in order to be able to generate an accurate model of the features, it is necessary to know the position of each vehicle as it travels through the local area, such that the sensor readings generated by the vehicle can be accurately correlated with those of other vehicles.

In some embodiments, images of the local area captured by an imaging system of the vehicle at different points in time can be used to determine a change in the position of the vehicle over a time period between the different points in time using a pairwise alignment algorithm, allowing for the position of the vehicle to be tracked over time. Pairwise alignment may provide for advantages over other methods for determining relative motion of a vehicle. For example, pairwise alignment may be used to determine position and relative motion of the vehicle with greater precision in comparison to using GPS (global positioning system) and/or IMU (inertial measurement unit). In addition, using LIDAR (light detection and ranging sensor) to determine relative motion of a vehicle, under certain conditions (e.g., within a tunnel), a LIDAR scan may not contain sufficient features for performing alignment. On the other hand, camera-based pairwise alignment are typically able to capture a larger amount of features that can be used to compute vehicle, allowing for position and motion tracking of the vehicle to be performed under a greater number of different conditions. In some embodiments, camera-based pairwise alignment may be used to complement other position or motion tracking techniques (e.g., GPS, IMU, LIDAR, etc.).

In some embodiments, systems, methods, and computer program products for generating a high definition (HD) map of a local area, based upon sensor readings of a vehicle traveling through the local area, is provided. For example, a method may comprise receiving, from an imaging system mounted on a vehicle, a plurality of image frames, each image frame associated with a local area surrounding the vehicle at a particular point in time, and comprising a first image captured using a first camera of the imaging system and a second image captured using a second camera of the imaging system. The method further comprises determining, for each image frame of the plurality of image frames, a set of features corresponding to features within the local area. For example, the method may identify a first set of feature points on the first image of the image frame, and a second set of feature points on the second image of the image frame, determine the set of features for the image frame, each corresponding to a feature point of the first set of feature points matched with a feature point of the second set of feature points, and determine a location of each feature of the set of features by triangulating the corresponding feature points of the first and second set of feature points. The method further comprises determining a transformation between a first position of the vehicle at a first point in time corresponding to a first image frame of the plurality of image frames, and a second position of the vehicle at a second point in time corresponding to a second image frame of the plurality of image frames. To determine the transformation, the method selects a first subset of features from the set of features associated with the first image frame, identifies a second subset of features from the second image frame corresponding to the first subset of features, based upon a level of geometric similarity between the features of the first and second subsets, and uses the first and second subsets of features for each of the first and second image frames, determining the transformation between the determined positions of features of the first and second subsets of features. The method further comprises generating a high definition map of the local area based on the transformation, the high definition map for use in driving by one or more autonomous vehicles.

In some embodiments, a first region is extracted from the first and second images of each image frame. The first region may correspond to a portion of the image depicting a section of ground in front of the vehicle. In some embodiments, the first region is selected to correspond to a section of ground expected to be substantially planar and/or not containing any other moving objects. The first region is orthorectified, and features identified within the first region. In some embodiments, pairwise alignment is performed based upon the identified features within the first regions of different image frames. In some embodiments, a second region is extracted from the first and second images of each image frame, the second region corresponding to a portion of the local area expected to be located at least a threshold distance away from the vehicle. In some embodiments, pairwise alignment is performed based upon identified features within both the first and second regions of each of the image frames.

BRIEF DESCRIPTION OF THE DRAWINGS

The teachings of the embodiments disclosed herein can be readily understood by considering the following detailed description in conjunction with the accompanying drawings.

Figure 1:
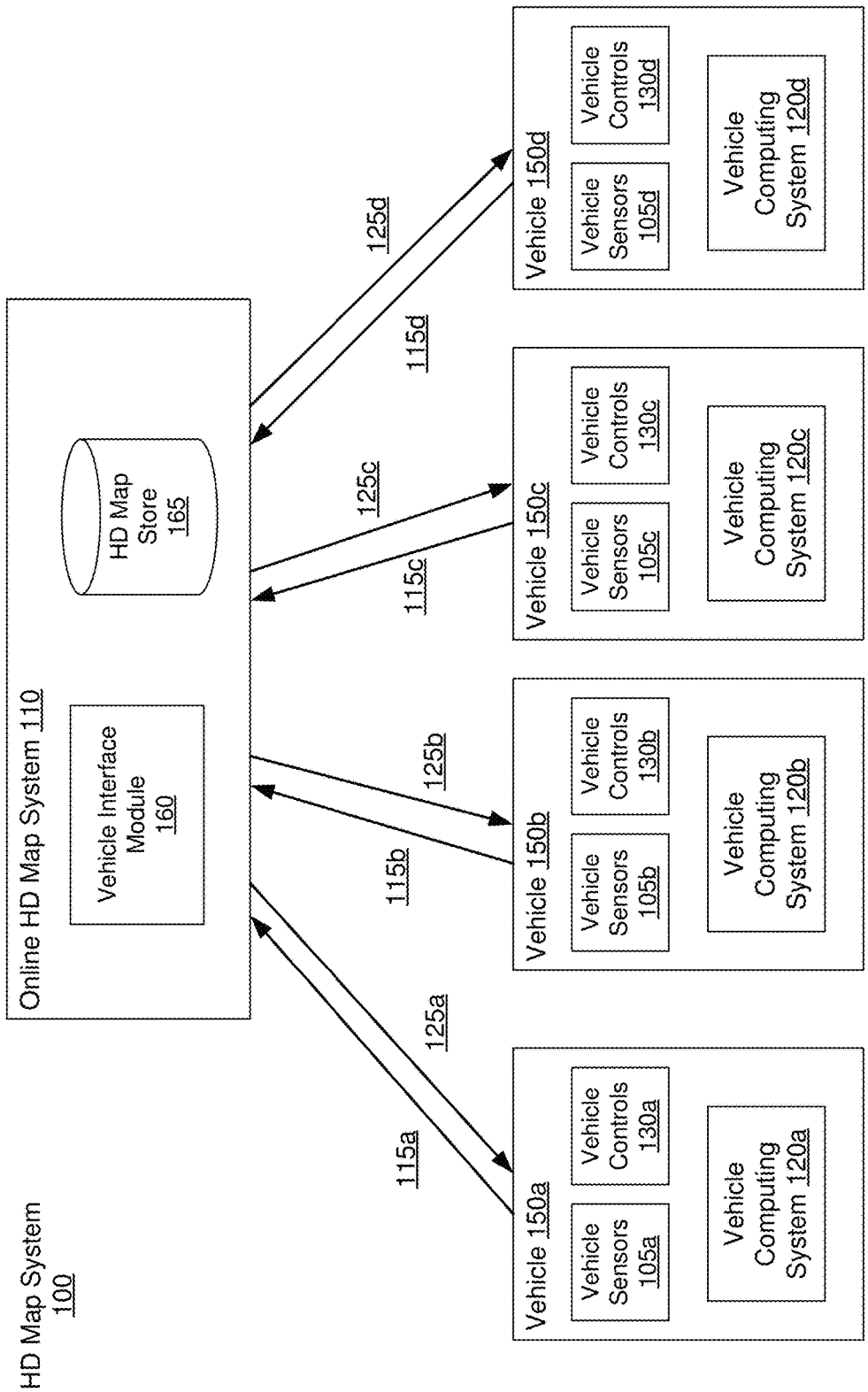
FIG. 1 shows the overall system environment of an HD map system interacting with multiple vehicle computing systems, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments of the invention maintain high definition (HD) maps containing up to date information using high precision. The HD maps may be used by autonomous vehicles to safely navigate to their destinations without human input or with limited human input. An autonomous vehicle is a vehicle capable of sensing its environment and navigating without human input. Autonomous vehicles may also be referred to herein as "driverless car," "self-driving car," or "robotic car." An HD map refers to a map storing data with very high precision, typically 5-10 cm. Embodiments generate HD maps containing spatial geometric information about the roads on which an autonomous vehicle can travel. Accordingly, the generated HD maps include the information necessary for an autonomous vehicle navigating safely without human intervention. Instead of collecting data for the HD maps using an expensive and time consuming mapping fleet process including vehicles outfitted with high resolution sensors, embodiments of the invention use data from the lower resolution sensors of the self-driving vehicles themselves as they drive around through their environments. The vehicles may have no prior map data for these routes or even for the region. Embodiments of the invention provide location as a service (LaaS) such that autonomous vehicles of different manufacturers can each have access to the most up-to-date map information created via these embodiments of invention.

Embodiments generate and maintain high definition (HD) maps that are accurate and include the most updated road conditions for safe navigation. For example, the HD maps provide the current location of the autonomous vehicle relative to the lanes of the road precisely enough to allow the autonomous vehicle to drive safely in the lane.

Overview

HD maps store a very large amount of information, and therefore face challenges in managing the information. For example, an HD map for a large geographic region may not fit on the local storage of a vehicle. Embodiments of the invention provide the necessary portion of an HD map to an autonomous vehicle that allows the vehicle to determine its current location in the HD map, determine the features on the road relative to the vehicle's position, determine if it is safe to move the vehicle based on physical constraints and legal constraints, etc. Examples of physical constraints include physical obstacles, such as walls, and examples of legal constraints include legally allowed direction of travel for a lane, speed limits, yields, stops.

Embodiments of the invention allow safe navigation for an autonomous vehicle by providing low latency, for example, 10-20 milliseconds or less for providing a response to a request; high accuracy in terms of location, i.e., accuracy within 10 cm or less; freshness of data by ensuring that the map is updated to reflect changes on the road within a reasonable time frame; and storage efficiency by minimizing the storage needed for the HD Map.

FIG. 1 shows the overall system environment of an HD map system interacting with multiple vehicles, according to an embodiment. The HD map system 100 includes an online HD map system 110 that interacts with a plurality of vehicles 150. The vehicles 150 may be autonomous vehicles but are not required to be. The online HD map system 110 receives sensor data captured by sensors of the vehicles, and combines the data received from the vehicles 150 to generate and maintain HD maps. The online HD map system 110 sends HD map data to the vehicles for use in driving the vehicles. In an embodiment, the online HD map system 110 is implemented as a distributed computing system, for example, a cloud based service that allows clients such as vehicle computing systems 120 to make requests for information and services. For example, a vehicle computing system 120 may make a request for HD map data for driving along a route and the online HD map system 110 provides the requested HD map data.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
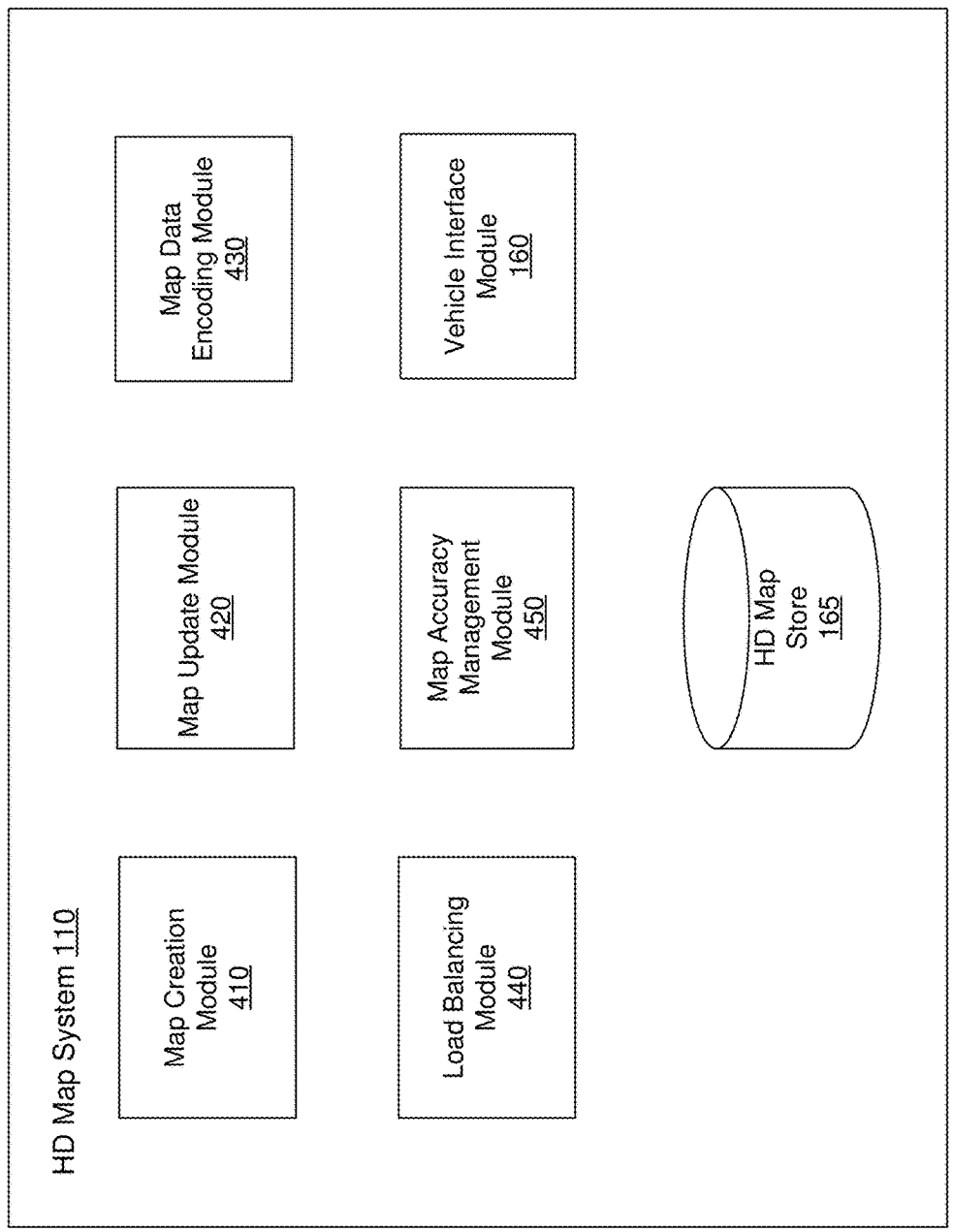
FIG. 4 shows the system architecture of an HD map system, according to an embodiment.

The online HD map system 110 comprises a vehicle interface module 160 and an HD map store 165. The online HD map system 110 interacts with the vehicle computing system 120 of various vehicles 150 using the vehicle interface module 160. The online HD map system 110 stores map information for various geographical regions in the HD map store 165. The online HD map system 110 may include other modules than those shown in FIG. 1, for example, various other modules as illustrated in FIG. 4 and further described herein.

The online HD map system 110 receives 115 data collected by sensors of a plurality of vehicles 150, for example, hundreds or thousands of cars. The vehicles provide sensor data captured while driving along various routes and send it to the online HD map system 110. The online HD map system 110 uses the data received from the vehicles 150 to create and update HD maps describing the regions in which the vehicles 150 are driving. The online HD map system 110 builds high definition maps based on the collective information received from the vehicles 150 and stores the HD map information in the HD map store 165.

The online HD map system 110 sends 125 HD maps to individual vehicles 150 as required by the vehicles 150. For example, if an autonomous vehicle needs to drive along a route, the vehicle computing system 120 of the autonomous vehicle provides information describing the route being travelled to the online HD map system 110. In response, the online HD map system 110 provides the required HD maps for driving along the route.

In an embodiment, the online HD map system 110 sends portions of the HD map data to the vehicles in a compressed format so that the data transmitted consumes less bandwidth. The online HD map system 110 receives from various vehicles, information describing the data that is stored at the local HD map store 275 of the vehicle. If the online HD map system 110 determines that the vehicle does not have certain portion of the HD map stored locally in the local HD map store 275, the online HD map system 110 sends that portion of the HD map to the vehicle. If the online HD map system 110 determines that the vehicle did previously receive that particular portion of the HD map but the corresponding data was updated by the online HD map system 110 since the vehicle last received the data, the online HD map system 110 sends an update for that portion of the HD map stored at the vehicle. This allows the online HD map system 110 to minimize the amount of data that is communicated with the vehicle and also to keep the HD map data stored locally in the vehicle updated on a regular basis.

A vehicle 150 includes vehicle sensors 105, vehicle controls 130, and a vehicle computing system 120. The vehicle sensors 105 allow the vehicle 150 to detect the surroundings of the vehicle as well as information describing the current state of the vehicle, for example, information describing the location and motion parameters of the vehicle. The vehicle sensors 105 comprise a camera, a light detection and ranging sensor (LIDAR), a global positioning system (GPS) navigation system, an inertial measurement unit (IMU), and others. The vehicle has one or more cameras that capture images of the surroundings of the vehicle. A LIDAR surveys the surroundings of the vehicle by measuring distance to a target by illuminating that target with a laser light pulses, and measuring the reflected pulses. The GPS navigation system determines the position of the vehicle based on signals from satellites. An IMU is an electronic device that measures and reports motion data of the vehicle such as velocity, acceleration, direction of movement, speed, angular rate, and so on using a combination of accelerometers and gyroscopes or other measuring instruments.

The vehicle controls 130 control the physical movement of the vehicle, for example, acceleration, direction change, starting, stopping, and so on. The vehicle controls 130 include the machinery for controlling the accelerator, brakes, steering wheel, and so on. The vehicle computing system 120 continuously provides control signals to the vehicle controls 130, thereby causing an autonomous vehicle to drive along a selected route.

The vehicle computing system 120 performs various tasks including processing data collected by the sensors as well as map data received from the online HD map system 110. The vehicle computing system 120 also processes data for sending to the online HD map system 110. Details of the vehicle computing system are illustrated in FIG. 2 and further described in connection with FIG. 2.

The interactions between the vehicle computing systems 120 and the online HD map system 110 are typically performed via a network, for example, via the Internet. The network enables communications between the vehicle computing systems 120 and the online HD map system 110. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
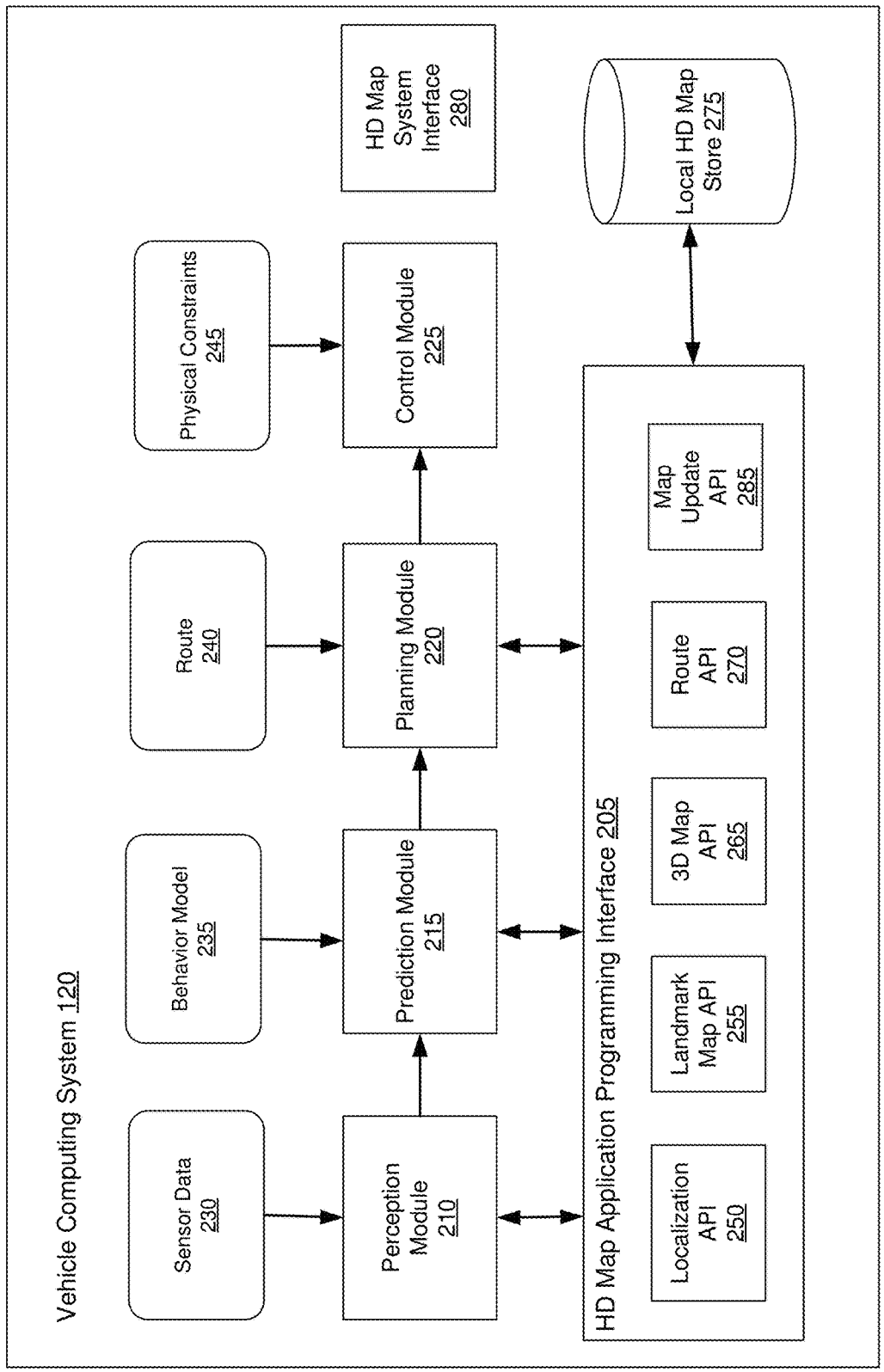
FIG. 2 shows the system architecture of a vehicle computing system, according to an embodiment.

FIG. 2 shows the system architecture of a vehicle computing system, according to an embodiment. The vehicle computing system 120 comprises a perception module 210, prediction module 215, planning module 220, a control module 225, a local HD map store 275, an HD map system interface 280, and an HD map application programming interface (API) 205. The various modules of the vehicle computing system 120 process various type of data including sensor data 230, a behavior model 235, routes 240, and physical constraints 245. In other embodiments, the vehicle computing system 120 may have more or fewer modules. Functionality described as being implemented by a particular module may be implemented by other modules.

The perception module 210 receives sensor data 230 from the sensors 105 of the vehicle 150. This includes data collected by cameras of the car, LIDAR, IMU, GPS navigation system, and so on. The perception module 210 uses the sensor data to determine what objects are around the vehicle, the details of the road on which the vehicle is travelling, and so on. The perception module 210 processes the sensor data 230 to populate data structures storing the sensor data and provides the information to the prediction module 215.

The prediction module 215 interprets the data provided by the perception module using behavior models of the objects perceived to determine whether an object is moving or likely to move. For example, the prediction module 215 may determine that objects representing road signs are not likely to move, whereas objects identified as vehicles, people, and so on, are either moving or likely to move. The prediction module 215 uses the behavior models 235 of various types of objects to determine whether they are likely to move. The prediction module 215 provides the predictions of various objects to the planning module 200 to plan the subsequent actions that the vehicle needs to take next.

The planning module 200 receives the information describing the surroundings of the vehicle from the prediction module 215, the route 240 that determines the destination of the vehicle, and the path that the vehicle should take to get to the destination. The planning module 200 uses the information from the prediction module 215 and the route 240 to plan a sequence of actions that the vehicle needs to take within a short time interval, for example, within the next few seconds. In an embodiment, the planning module 200 specifies the sequence of actions as one or more points representing nearby locations that the vehicle needs to drive through next. The planning module 200 provides the details of the plan comprising the sequence of actions to be taken by the vehicle to the control module 225. The plan may determine the subsequent action of the vehicle, for example, whether the vehicle performs a lane change, a turn, acceleration by increasing the speed or slowing down, and so on.

The control module 225 determines the control signals for sending to the controls 130 of the vehicle based on the plan received from the planning module 200. For example, if the vehicle is currently at point A and the plan specifies that the vehicle should next go to a nearby point B, the control module 225 determines the control signals for the controls 130 that would cause the vehicle to go from point A to point B in a safe and smooth way, for example, without taking any sharp turns or a zig zag path from point A to point B. The path taken by the vehicle to go from point A to point B may depend on the current speed and direction of the vehicle as well as the location of point B with respect to point A. For example, if the current speed of the vehicle is high, the vehicle may take a wider turn compared to a vehicle driving slowly.

The control module 225 also receives physical constraints 245 as input. These include the physical capabilities of that specific vehicle. For example, a car having a particular make and model may be able to safely make certain types of vehicle movements such as acceleration, and turns that another car with a different make and model may not be able to make safely. The control module 225 incorporates these physical constraints in determining the control signals. The control module 225 sends the control signals to the vehicle controls 130 that cause the vehicle to execute the specified sequence of actions causing the vehicle to move as planned. The above steps are constantly repeated every few seconds causing the vehicle to drive safely along the route that was planned for the vehicle.

The various modules of the vehicle computing system 120 including the perception module 210, prediction module 215, and planning module 220 receive map information to perform their respective computation. The vehicle 100 stores the HD map data in the local HD map store 275. The modules of the vehicle computing system 120 interact with the map data using the HD map API 205 that provides a set of application programming interfaces (APIs) that can be invoked by a module for accessing the map information. The HD map system interface 280 allows the vehicle computing system 120 to interact with the online HD map system 110 via a network (not shown in the Figures). The local HD map store 275 stores map data in a format specified by the HD Map system 110. The HD map API 205 is capable of processing the map data format as provided by the HD Map system 110. The HD Map API 205 provides the vehicle computing system 120 with an interface for interacting with the HD map data. The HD map API 205 includes several APIs including the localization API 250, the landmark map API 255, the route API 265, the 3D map API 270, the map update API 285, and so on.

The localization APIs 250 determine the current location of the vehicle, for example, when the vehicle starts and as the vehicle moves along a route. The localization APIs 250 include a localize API that determines an accurate location of the vehicle within the HD Map. The vehicle computing system 120 can use the location as an accurate relative positioning for making other queries, for example, feature queries, navigable space queries, and occupancy map queries further described herein. The localize API receives inputs comprising one or more of, location provided by GPS, vehicle motion data provided by IMU, LIDAR scanner data, and camera images. The localize API returns an accurate location of the vehicle as latitude and longitude coordinates. The coordinates returned by the localize API are more accurate compared to the GPS coordinates used as input, for example, the output of the localize API may have precision range from 5-10 cm. In one embodiment, the vehicle computing system 120 invokes the localize API to determine location of the vehicle periodically based on the LIDAR using scanner data, for example, at a frequency of 10 Hz. The vehicle computing system 120 may invoke the localize API to determine the vehicle location at a higher rate (e.g., 60 Hz) if GPS/IMU data is available at that rate. The vehicle computing system 120 stores as internal state, location history records to improve accuracy of subsequent localize calls. The location history record stores history of location from the point-in-time, when the car was turned off/stopped. The localization APIs 250 include a localize-route API generates an accurate route specifying lanes based on the HD map. The localize-route API takes as input a route from a source to destination via a third party maps and generates a high precision routes represented as a connected graph of navigable lanes along the input routes based on HD maps.

The landmark map API 255 provides the geometric and semantic description of the world around the vehicle, for example, description of various portions of lanes that the vehicle is currently travelling on. The landmark map APIs 255 comprise APIs that allow queries based on landmark maps, for example, fetch-lanes API and fetch-features API. The fetch-lanes API provide lane information relative to the vehicle and the fetch-features API. The fetch-lanes API receives as input a location, for example, the location of the vehicle specified using latitude and longitude of the vehicle and returns lane information relative to the input location. The fetch-lanes API may specify a distance parameters indicating the distance relative to the input location for which the lane information is retrieved. The fetch-features API receives information identifying one or more lane elements and returns landmark features relative to the specified lane elements. The landmark features include, for each landmark, a spatial description that is specific to the type of landmark.

The 3D map API 265 provides efficient access to the spatial 3-dimensional (3D) representation of the road and various physical objects around the road as stored in the local HD map store 275. The 3D map APIs 365 include a fetch-navigable-surfaces API and a fetch-occupancy-grid API. The fetch-navigable-surfaces API receives as input, identifiers for one or more lane elements and returns navigable boundaries for the specified lane elements. The fetch-occupancy-grid API receives a location as input, for example, a latitude and longitude of the vehicle, and returns information describing occupancy for the surface of the road and all objects available in the HD map near the location. The information describing occupancy includes a hierarchical volumetric grid of all positions considered occupied in the map. The occupancy grid includes information at a high resolution near the navigable areas, for example, at curbs and bumps, and relatively low resolution in less significant areas, for example, trees and walls beyond a curb. The fetch-occupancy-grid API is useful for detecting obstacles and for changing direction if necessary.

The 3D map APIs also include map update APIs, for example, download-map-updates API and upload-map-updates API. The download-map-updates API receives as input a planned route identifier and downloads map updates for data relevant to all planned routes or for a specific planned route. The upload-map-updates API uploads data collected by the vehicle computing system 120 to the online HD map system 110. This allows the online HD map system 110 to keep the HD map data stored in the online HD map system 110 up to date based on changes in map data observed by sensors of vehicles driving along various routes.

The route API 270 returns route information including full route between a source and destination and portions of route as the vehicle travels along the route. The 3D map API 365 allows querying the HD Map. The route APIs 270 include add-planned-routes API and get-planned-route API. The add-planned-routes API provides information describing planned routes to the online HD map system 110 so that information describing relevant HD maps can be downloaded by the vehicle computing system 120 and kept up to date. The add-planned-routes API receives as input, a route specified using polylines expressed in terms of latitudes and longitudes and also a time-to-live (TTL) parameter specifying a time period after which the route data can be deleted. Accordingly, the add-planned-routes API allows the vehicle to indicate the route the vehicle is planning on taking in the near future as an autonomous trip. The add-planned-route API aligns the route to the HD map, records the route and its TTL value, and makes sure that the HD map data for the route stored in the vehicle computing system 120 is up to date. The get-planned-routes API returns a list of planned routes and provides information describing a route identified by a route identifier.

The map update API 285 manages operations related to update of map data, both for the local HD map store 275 and for the HD map store 165 stored in the online HD map system 110. Accordingly, modules in the vehicle computing system 120 invoke the map update API 285 for downloading data from the online HD map system 110 to the vehicle computing system 120 for storing in the local HD map store 275 as necessary. The map update API 285 also allows the vehicle computing system 120 to determine whether the information monitored by the vehicle sensors 105 indicates a discrepancy in the map information provided by the online HD map system 110 and uploads data to the online HD map system 110 that may result in the online HD map system 110 updating the map data stored in the HD map store 165 that is provided to other vehicles 150.

FIG. 4 illustrates the various layers of instructions in the HD Map API of a vehicle computing system, according to an embodiment. Different manufacturer of vehicles have different instructions for receiving information from vehicle sensors 105 and for controlling the vehicle controls 130. Furthermore, different vendors provide different compute platforms with autonomous driving capabilities, for example, collection and analysis of vehicle sensor data. Examples of compute platform for autonomous vehicles include platforms provided vendors, such as NVIDIA, QUALCOMM, and INTEL. These platforms provide functionality for use by autonomous vehicle manufacturers in manufacture of autonomous vehicles. A vehicle manufacturer can use any one or several compute platforms for autonomous vehicles. The online HD map system 110 provides a library for processing HD maps based on instructions specific to the manufacturer of the vehicle and instructions specific to a vendor specific platform of the vehicle. The library provides access to the HD map data and allows the vehicle to interact with the online HD map system 110.

Figure 3:
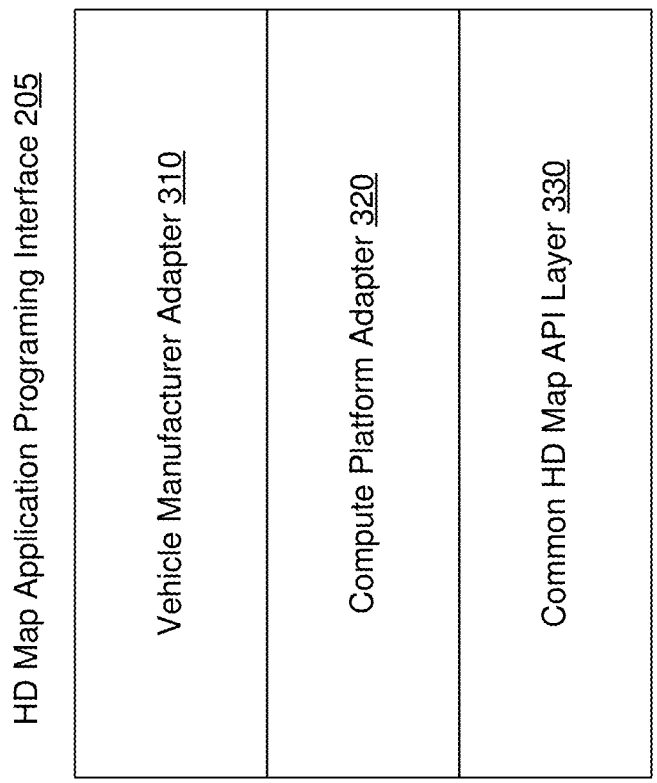
FIG. 3 illustrates the various layers of instructions in the HD Map API of a vehicle computing system, according to an embodiment.

As shown in FIG. 3, in an embodiment, the HD map API is implemented as a library that includes a vehicle manufacturer adapter 310, a compute platform adapter 320, and a common HD map API layer 330. The common HD map API layer comprises generic instructions that can be used across a plurality of vehicle compute platforms and vehicle manufacturers. The compute platform adapter 320 include instructions that are specific to each computer platform. For example, the common HD Map API layer 330 may invoke the compute platform adapter 320 to receive data from sensors supported by a specific compute platform. The vehicle manufacturer adapter 310 comprises instructions specific to a vehicle manufacturer. For example, the common HD map API layer 330 may invoke functionality provided by the vehicle manufacturer adapter 310 to send specific control instructions to the vehicle controls 130.

The online HD map system 110 stores compute platform adapters 320 for a plurality of compute platforms and vehicle manufacturer adapters 310 for a plurality of vehicle manufacturers. The online HD map system 110 determines the particular vehicle manufacturer and the particular compute platform for a specific autonomous vehicle. The online HD map system 110 selects the vehicle manufacturer adapter 310 for the particular vehicle manufacturer and the compute platform adapter 320 the particular compute platform of that specific vehicle. The online HD map system 110 sends instructions of the selected vehicle manufacturer adapter 310 and the selected compute platform adapter 320 to the vehicle computing system 120 of that specific autonomous vehicle. The vehicle computing system 120 of that specific autonomous vehicle installs the received vehicle manufacturer adapter 310 and the compute platform adapter 320. The vehicle computing system 120 periodically checks if the online HD map system 110 has an update to the installed vehicle manufacturer adapter 310 and the compute platform adapter 320. If a more recent update is available compared to the version installed on the vehicle, the vehicle computing system 120 requests and receives the latest update and installs it.

HD Map System Architecture

FIG. 4 shows the system architecture of an HD map system, according to an embodiment. The online HD map system 110 comprises a map creation module 410, a map update module 420, a map data encoding module 430, a load balancing module 440, a map accuracy management module, a vehicle interface module, and a HD map store 165. Other embodiments of online HD map system 110 may include more or fewer modules than shown in FIG. 4. Functionality indicated as being performed by a particular module may be implemented by other modules. In an embodiment, the online HD map system 110 may be a distributed system comprising a plurality of processors.

The map creation module 410 creates the map from map data collected from several vehicles that are driving along various routes. The map update module 420 updates previously computed map data by receiving more recent information from vehicles that recently travelled along routes on which map information changed. For example, if certain road signs have changed or lane information has changed as a result of construction in a region, the map update module 420 updates the maps accordingly. The map data encoding module 430 encodes map data to be able to store the data efficiently as well as send the required map data to vehicles 150 efficiently. The load balancing module 440 balances load across vehicles to ensure that requests to receive data from vehicles are uniformly distributed across different vehicles. The map accuracy management module 450 maintains high accuracy of the map data using various techniques even though the information received from individual vehicles may not have high accuracy.

Figure 5:
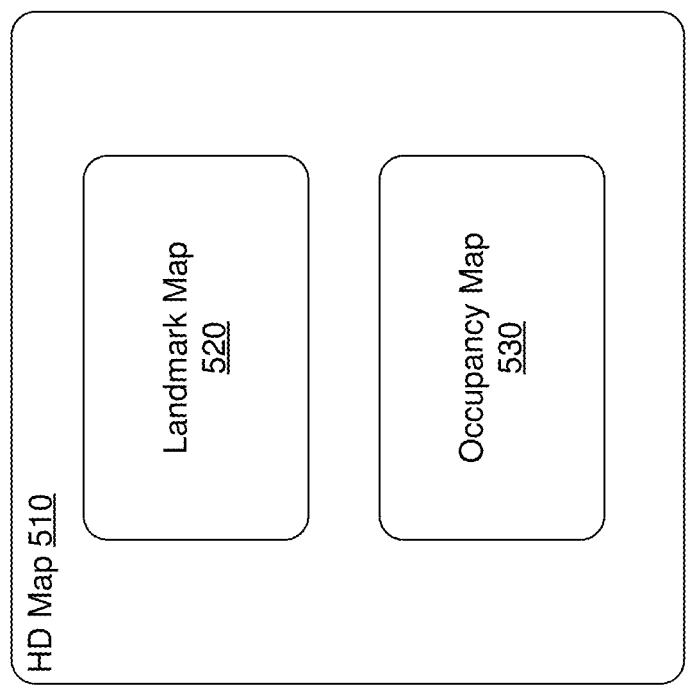
FIG. 5 illustrates the components of an HD map, according to an embodiment.

FIG. 5 illustrates the components of an HD map, according to an embodiment. The HD map comprises maps of several geographical regions. The HD map 510 of a geographical region comprises a landmark map (LMap) 520 and an occupancy map (OMap) 530. The landmark map comprises information describing lanes including spatial location of lanes and semantic information about each lane. The spatial location of a lane comprises the geometric location in latitude, longitude and elevation at high prevision, for example, at or below 10 cm precision. The semantic information of a lane comprises restrictions such as direction, speed, type of lane (for example, a lane for going straight, a left turn lane, a right turn lane, an exit lane, and the like), restriction on crossing to the left, connectivity to other lanes and so on. The landmark map may further comprise information describing stop lines, yield lines, spatial location of cross walks, safely navigable space, spatial location of speed bumps, curb, and road signs comprising spatial location and type of all signage that is relevant to driving restrictions. Examples of road signs described in an HD map include stop signs, traffic lights, speed limits, one-way, do-not-enter, yield (vehicle, pedestrian, animal), and so on.

The occupancy map 530 comprises spatial 3-dimensional (3D) representation of the road and all physical objects around the road. The data stored in an occupancy map 530 is also referred to herein as occupancy grid data. The 3D representation may be associated with a confidence score indicative of a likelihood of the object existing at the location. The occupancy map 530 may be represented in a number of other ways. In one embodiment, the occupancy map 530 is represented as a 3D mesh geometry (collection of triangles) which covers the surfaces. In another embodiment, the occupancy map 530 is represented as a collection of 3D points which cover the surfaces. In another embodiment, the occupancy map 530 is represented using a 3D volumetric grid of cells at 5-10 cm resolution. Each cell indicates whether or not a surface exists at that cell, and if the surface exists, a direction along which the surface is oriented.

The occupancy map 530 may take a large amount of storage space compared to a landmark map 520. For example, data of 1 GB/Mile may be used by an occupancy map 530, resulting in the map of the United States (including 4 million miles of road) occupying 4×1015 bytes or 4 petabytes. Therefore the online HD map system 110 and the vehicle computing system 120 use data compression techniques for being able to store and transfer map data thereby reducing storage and transmission costs. Accordingly, the techniques disclosed herein make self-driving of autonomous vehicles possible.

In one embodiment, the HD Map does not require or rely on data typically included in maps, such as addresses, road names, ability to geo-code an address, and ability to compute routes between place names or addresses. The vehicle computing system 120 or the online HD map system 110 accesses other map systems, for example, GOOGLE MAPs to obtain this information. Accordingly, a vehicle computing system 120 or the online HD map system 110 receives navigation instructions from a tool such as GOOGLE MAPs into a route and converts the information to a route based on the HD map information.

Geographical Regions in HD Maps

The online HD map system 110 divides a large physical area into geographical regions and stores a representation of each geographical region. Each geographical region represents a contiguous area bounded by a geometric shape, for example, a rectangle or square. In an embodiment, the online HD map system 110 divides a physical area into geographical regions of the same size independent of the amount of data required to store the representation of each geographical region. In another embodiment, the online HD map system 110 divides a physical area into geographical regions of different sizes, where the size of each geographical region is determined based on the amount of information needed for representing the geographical region. For example, a geographical region representing a densely populated area with a large number of streets represents a smaller physical area compared to a geographical region representing sparsely populated area with very few streets. Accordingly, in this embodiment, the online HD map system 110 determines the size of a geographical region based on an estimate of an amount of information required to store the various elements of the physical area relevant for an HD map.

In an embodiment, the online HD map system 110 represents a geographic region using an object or a data record that comprises various attributes including, a unique identifier for the geographical region, a unique name for the geographical region, description of the boundary of the geographical region, for example, using a bounding box of latitude and longitude coordinates, and a collection of landmark features and occupancy grid data.

Figure 6A:
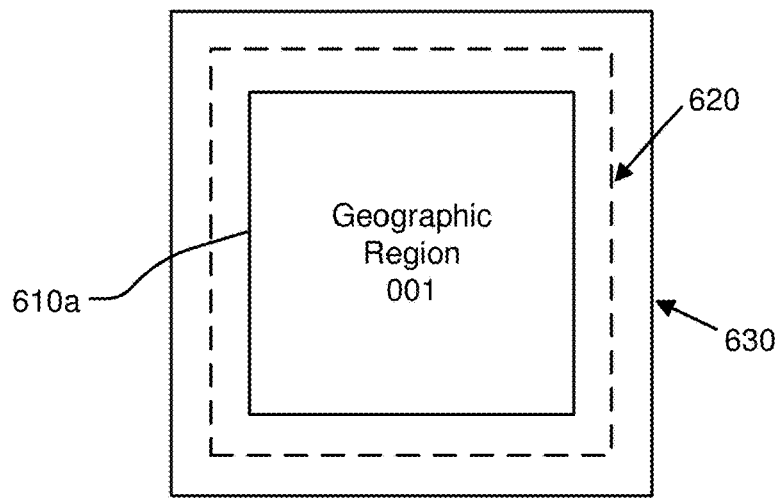
FIGS. 6A-B illustrate geographical regions defined in an HD map, according to an embodiment.
Figure 6B:
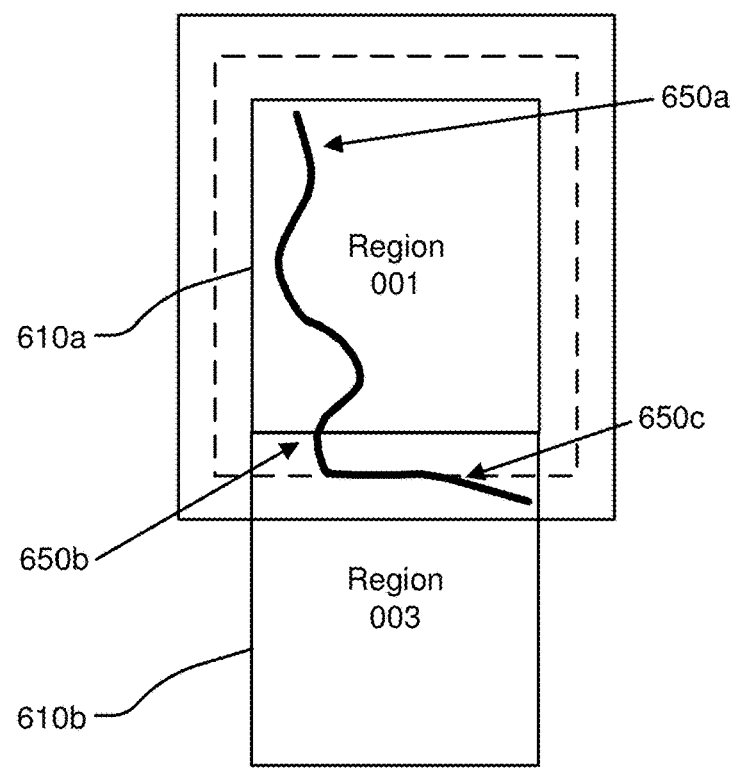

FIGS. 6A-B illustrate geographical regions defined in an HD map, according to an embodiment. FIG. 6A shows a square geographical region 610a. FIG. 6B shows two neighboring geographical regions 610a and 610b. The online HD map system 110 stores data in a representation of a geographical region that allows for smooth transition from one geographical region to another as a vehicle drives across geographical region boundaries.

According to an embodiment, as illustrated in FIG. 6, each geographic region has a buffer of a predetermined width around it. The buffer comprises redundant map data around all 4 sides of a geographic region (in the case that the geographic region is bounded by a rectangle). FIG. 6A shows a boundary 620 for a buffer of 50 meters around the geographic region 610a and a boundary 630 for buffer of 100 meters around the geographic region 610a. The vehicle computing system 120 switches the current geographical region of a vehicle from one geographical region to the neighboring geographical region when the vehicle crosses a threshold distance within this buffer. For example, as shown in FIG. 6B, a vehicle starts at location 650a in the geographical region 610a. The vehicle traverses along a route to reach a location 650b where it cross the boundary of the geographical region 610 but stays within the boundary 620 of the buffer. Accordingly, the vehicle computing system 120 continues to use the geographical region 610a as the current geographical region of the vehicle. Once the vehicle crosses the boundary 620 of the buffer at location 650c, the vehicle computing system 120 switches the current geographical region of the vehicle to geographical region 610b from 610a. The use of a buffer prevents rapid switching of the current geographical region of a vehicle as a result of the vehicle travelling along a route that closely tracks a boundary of a geographical region.

Lane Representations in HD Maps

The HD map system 100 represents lane information of streets in HD maps. Although the embodiments described herein refer to streets, the techniques are applicable to highways, alleys, avenues, boulevards, or any other path on which vehicles can travel. The HD map system 100 uses lanes as a reference frame for purposes of routing and for localization of a vehicle. The lanes represented by the HD map system 100 include lanes that are explicitly marked, for example, white and yellow striped lanes, lanes that are implicit, for example, on a country road with no lines or curbs but two directions of travel, and implicit paths that act as lanes, for example, the path that a turning car makes when entering a lane from another lane. The HD map system 100 also stores information relative to lanes, for example, landmark features such as road signs and traffic lights relative to the lanes, occupancy grids relative to the lanes for obstacle detection, and navigable spaces relative to the lanes so the vehicle can efficiently plan/react in emergencies when the vehicle must make an unplanned move out of the lane. Accordingly, the HD map system 100 stores a representation of a network of lanes to allow a vehicle to plan a legal path between a source and a destination and to add a frame of reference for real time sensing and control of the vehicle. The HD map system 100 stores information and provides APIs that allow a vehicle to determine the lane that the vehicle is currently in, the precise vehicle location relative to the lane geometry, and all relevant features/data relative to the lane and adjoining and connected lanes.

Figure 7:
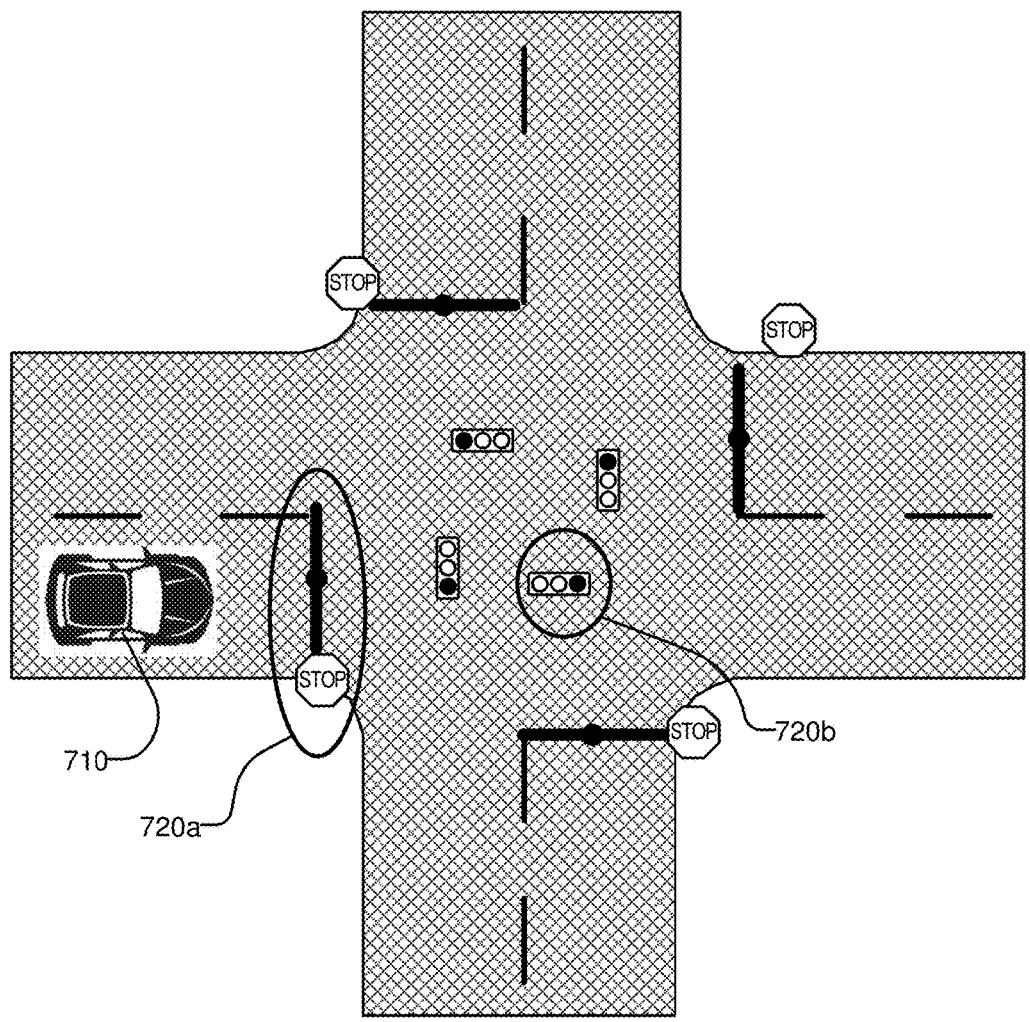
FIG. 7 illustrates representations of lanes in an HD map, according to an embodiment.

FIG. 7 illustrates lane representations in an HD map, according to an embodiment. FIG. 7 shows a vehicle 710 at a traffic intersection. The HD map system provides the vehicle with access to the map data that is relevant for autonomous driving of the vehicle. This includes, for example, features 720a and 720b that are associated with the lane but may not be the closest features to the vehicle. Therefore, the HD map system 100 stores a lane-centric representation of data that represents the relationship of the lane to the feature so that the vehicle can efficiently extract the features given a lane.

The HD map system 100 represents portions of the lanes as lane elements. A lane element specifies the boundaries of the lane and various constraints including the legal direction in which a vehicle can travel within the lane element, the speed with which the vehicle can drive within the lane element, whether the lane element is for left turn only, or right turn only, and so on. The HD map system 100 represents a lane element as a continuous geometric portion of a single vehicle lane. The HD map system 100 stores objects or data structures representing lane elements that comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations and so on.

Examples of lane elements represented by the HD map system 100 include, a piece of a right lane on a freeway, a piece of a lane on a road, a left turn lane, the turn from a left turn lane into another lane, a merge lane from an on-ramp an exit lane on an off-ramp, and a driveway. The HD map system 100 represents a one lane road using two lane elements, one for each direction. The HD map system 100 represents median turn lanes that are shared similar to a one-lane road.

Figure 8A:
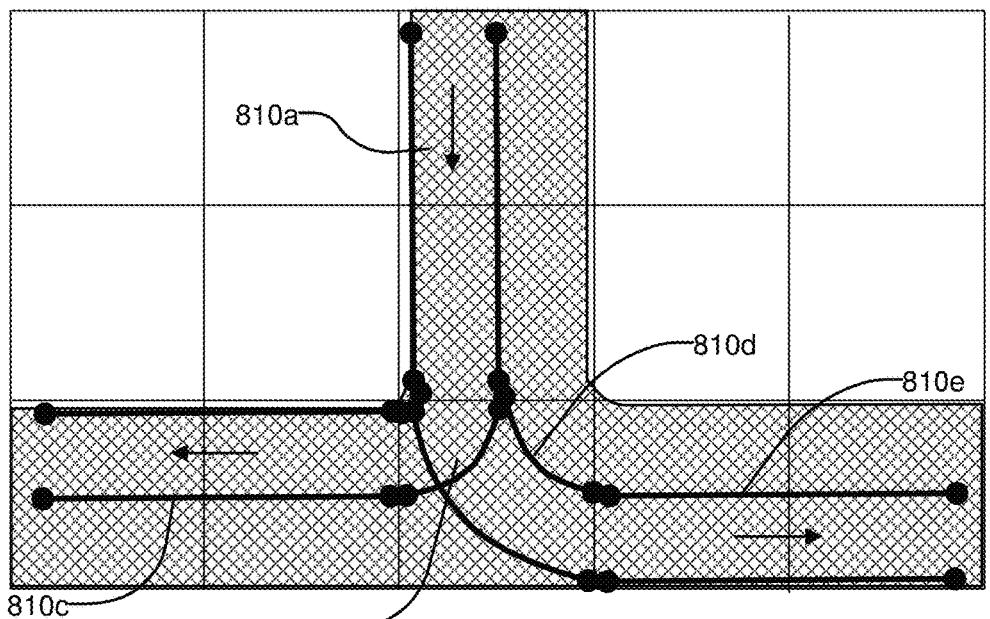
FIGS. 8A-B illustrates lane elements and relations between lane elements in an HD map, according to an embodiment.
Figure 8B:
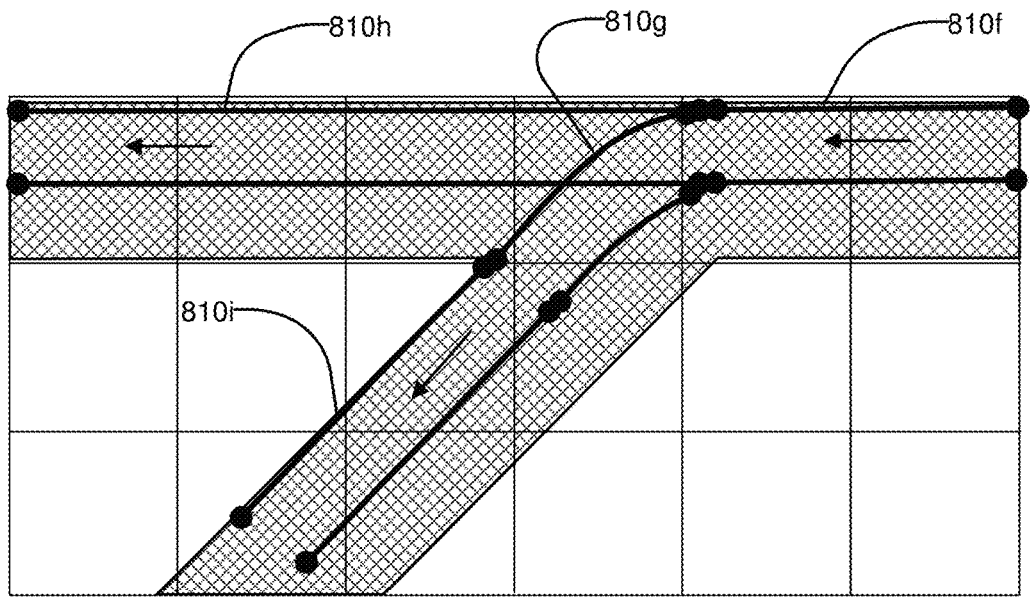

FIGS. 8A-B illustrates lane elements and relations between lane elements in an HD map, according to an embodiment. FIG. 8A shows an example of a T junction in a road illustrating a lane element 810a that is connected to lane element 810c via a turn lane 810b and is connected to lane 810e via a turn lane 810d. FIG. 8B shows an example of a Y junction in a road showing label 810f connected to lane 810h directly and connected to lane 810i via lane 810g. The HD map system 100 determines a route from a source location to a destination location as a sequence of connected lane elements that can be traversed to reach from the source location to the destination location.

Camera-Based Pairwise Alignment

As discussed above, in some embodiments an HD map can be generated based upon sensor data collected by a plurality of vehicles, which may include manned survey vehicles as well as self-driving autonomous vehicles or driver-assist vehicles, and can be used by autonomous vehicles to navigate through a mapped area without the need for human intervention.

As a vehicle (e.g., a vehicle 150) travels, sensors on the vehicle (e.g., vehicle sensors 105) generate data indicating the surroundings of the vehicle at different points in time. The acquired sensor data may be used to generate features for an HD map, corresponding to objects within a local area surrounding the vehicle, lane lines, signs, and/or the like. However, in order to generate the HD map, the pose of the vehicle within the local area must be known. As used herein, a "pose" of a vehicle may refer to both a position of the vehicle and an orientation of the vehicle. A pose of a vehicle may correspond to the origin and axes of a 3-D coordinate system corresponding to the vehicle, and may be expressed using six degrees of freedom (e.g., translation of the origin along global x, y, and z axes, and rotation of the vehicle's x, y, and z axes relative to global axes).

In some embodiments, the pose of the vehicle is determined by tracking changes in the vehicle's pose over different points in time, in a process referred to as "pairwise alignment." For example, pairwise alignment is used to determine a relative pose of the vehicle over different points in time, which may be used to determine a global pose of the vehicle using a global alignment process.

In some embodiments, pairwise alignment may be performed using an iterative closest point (ICP) algorithm to determine a transformation in the pose of the vehicle using LIDAR point clouds corresponding to different points in time, combined with GPS and/or IMU pose estimates. However, in some embodiments, ICP algorithms may be insufficient for determining vehicle pose. For example, in certain environments, such as within a tunnel or on a completely flat road, a LIDAR scan may not be able identify sufficient points to estimate the necessary 3-D surfaces to calculate relative motion of the vehicles (e.g., less than 3 mutually non-parallel surfaces). On the other hand, images of the local area captured using a camera or other imaging device may contain millions of pixels (in comparison to 50,000 LIDAR points) that may be used to identify additional features in the local area not captured in LIDAR point clouds, such as corners or edges of surface markings (e.g., broken lanes lines). As such, camera-based pairwise alignment techniques may be used instead of or in addition to ICP techniques using LIDAR.

Pairwise alignment is used to determine a transformation in a pose of the vehicle between different points in time, using images captured using an imaging system (comprising one or more cameras or other imaging devices) of the vehicle, thus allowing for a motion of the vehicle within the surrounding area to be determined. In some embodiments, at periodic points in time as the vehicle travels, the imaging system of the vehicle captures a one or more images, each depicting a portion of a local area surrounding the vehicle. For example, the one or more images may comprise at least two images (e.g., a left image and a right image) that form a stereo pair. In some embodiments, the set of captured images corresponding to a particular point in time may be referred to as a "frame," "image frame," or a "stereo image frame." As used herein, a frame corresponding to a set of images captured at a particular point in time N may be referred to as "frame N."

Figure 9:
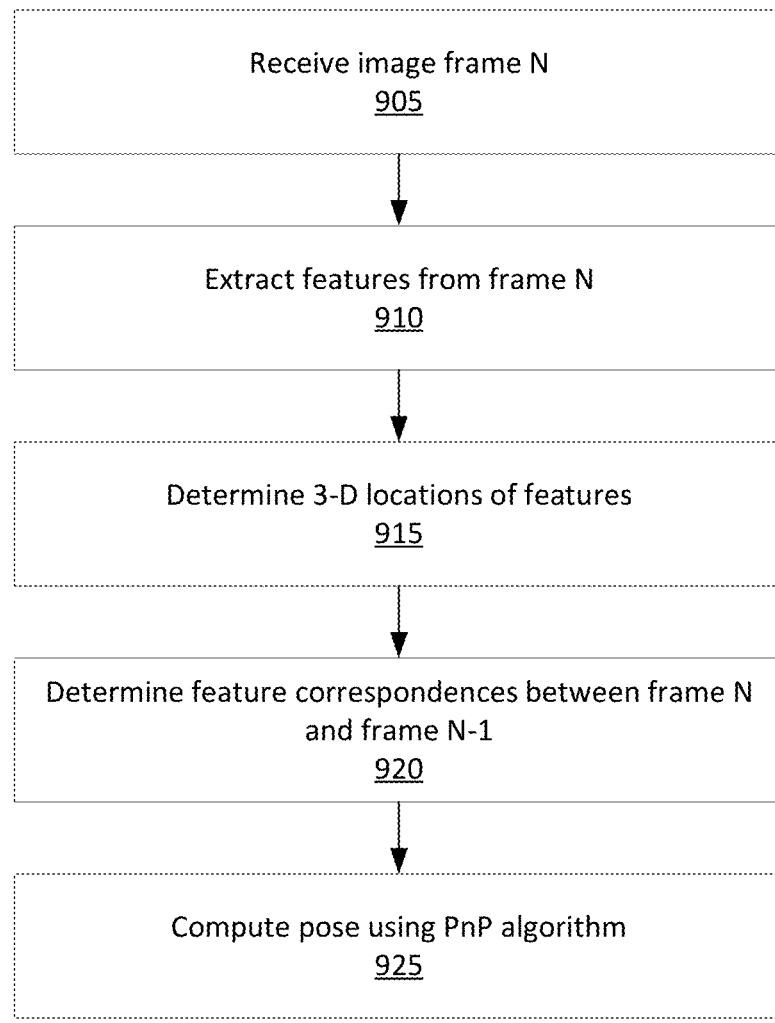
FIG. 9 is a flowchart illustrating a method for performing pairwise alignment between pairs of image frames, in accordance with some embodiments.

FIG. 9 is a flowchart illustrating a method for performing pairwise alignment between pairs of image frames, in accordance with some embodiments. In some embodiments, pairwise alignment is performed by a vehicle computing system (e.g., the vehicle computing system 120 illustrated in FIG. 2) associated with each vehicle. For example, in some embodiments, the vehicle computing system determines changes in the pose of the vehicle corresponding to different time periods, which may be uploaded to a server (e.g., the HD map system 110) to be used in construction of an HD map. However, it is understood that in other embodiments, one or more pairwise alignment steps may be performed by other components, such as the map creation module 410 of the HD map system 110. For example, in some embodiments, the HD map system 110 receives image frame information from a vehicle via the vehicle interface module 160, which may be used by the map creation module 410 or other module in the HD map system 110 to determine transformations of pose of the vehicle between different image frames corresponding to different times. As such, although the below description may refer to steps of the process as being performed by the vehicle computing system, it is understood that the steps may instead be performed by one or more modules of the online HD map system.

As illustrated in FIG. 9, the vehicle computing system receives 905 a image frame corresponding to a particular point in time (e.g., time N). The image frame ("frame N") may comprise one or more images captured by one or more cameras of the vehicle (e.g., vehicle sensors 105). In some embodiments, the frame N comprises at least a first image and a second image captured using two different cameras. The two cameras may form a stereo pair (e.g., mounted and calibrated to simply correspondence finding a triangulation between correspondences for determining 3-D points relative the vehicle). The first image and the second image may correspond to a left image and a right image.

The vehicle computing system extracts 910 a plurality of features from the received frame N. Features may correspond to any points within an image of the frame that are relatively distinguishable, such as edges, corners, or other identifiable physical characteristics associated with one or more objects within the local area. In some embodiments, one or more feature or corner detection algorithms are used to extract the features from one or more images of the frame N, such as Harris Corners, scale-invariant feature transform (SIFT) features, KAZE/AKAZE (accelerated KAZE), Features from Accelerated Segment Test (FAST), Shi/Kanade corners, and/or the like.

In some embodiments, where the frame N comprises a plurality of captured images (e.g., the first and second images), each of the captured images of the frame N are analyzed to determine a set of feature points on each image. The extracted features of the frame N each correspond to a first feature point on the first image of the frame, and a second feature point on the second image of the frame. In some embodiments, the first and second feature points on the first and second images are matched based upon a level of feature similarity, a distance between the locations of the first and second feature points on their respective images, and/or the like. Example methods for performing feature detection on a frame N are described in greater detail below in relation to FIG. 10.

The vehicle computing system determines 915, for each of the extracted features of the frame N, a 3D location of the feature. The 3D location of a feature indicates a position of the feature relative to the vehicle sensors on the vehicle. In some embodiments, the vehicle computing system determines the 3D location for each feature by triangulating the first and second feature points corresponding to the feature based upon their respective locations within the first and second images, and a known disparity between the first and second images (e.g., an offset distance between a first camera used to capture the first image and a second camera used to capture the second image). In other embodiments, the 3D locations of the features can be determined based upon a location of the feature within a single image and a known location of a ground plane, described in greater detail below in relation of FIGS. 12-15.

The vehicle computing system determines 920 feature correspondences between the extracted features of the frame N with extracted features of another image frame corresponding to a different point in time (e.g., a previous frame N−1 corresponding to a previous point in time N−1). In some embodiments, the vehicle computing system identifies a first set of features of the frame N, and identifies a corresponding second set of features of the frame N−1, based upon geometric relationships between the features of the set, feature descriptors of the features of the set, and/or the like.

The vehicle computing system computes 925 a pose of the vehicle based upon the determined feature correspondences. In some embodiments, the vehicle computing system determines a three-dimensional transformation between the pose of the vehicle at time N and at N−1, based upon a transformation between the locations of the first set of features of the frame N and the corresponding second set of features of the frame N−1. In some embodiments, the vehicle computing system uses a PnP (Perspective-n-Point) algorithm to calculate a 3-D transformation between the frames and determine a pose of the vehicle at the time N relative to at the time N−1.

In some embodiments, in order to reduce the effect of outlier features in the frames N and N−1, pose determination (e.g., using PnP) is performed in as part of a random sample consensus (RANSAC) loop. For example, moving objects and other changes in the local area may create features visible in the frame N or N−1 that are not useful for computing vehicle pose or for generating an HD map. As such, a RANSAC loop is performed in which transformations between different corresponding sets of features in the frames N and N−1 are evaluated in order to identifying a best-fitting transformation. Examples of methods for determining vehicle pose are described in greater detail below in relation to FIG. 11.

By determining the three-dimensional transformation of the vehicle's pose between different points in time, the location of the vehicle relative to objects and features in the surrounding area can be determined. When many different vehicles travel through a particular area, the paths that they take may be different and will thus influence the data collected by their respective sensor systems. By determining how the pose of each vehicles changes as they travel through the area, the sensor data collected by different vehicles traveling through different locations of the area can be correlated and used to populate features onto an HD map of the area.

Frame Feature Detection

Figure 10:
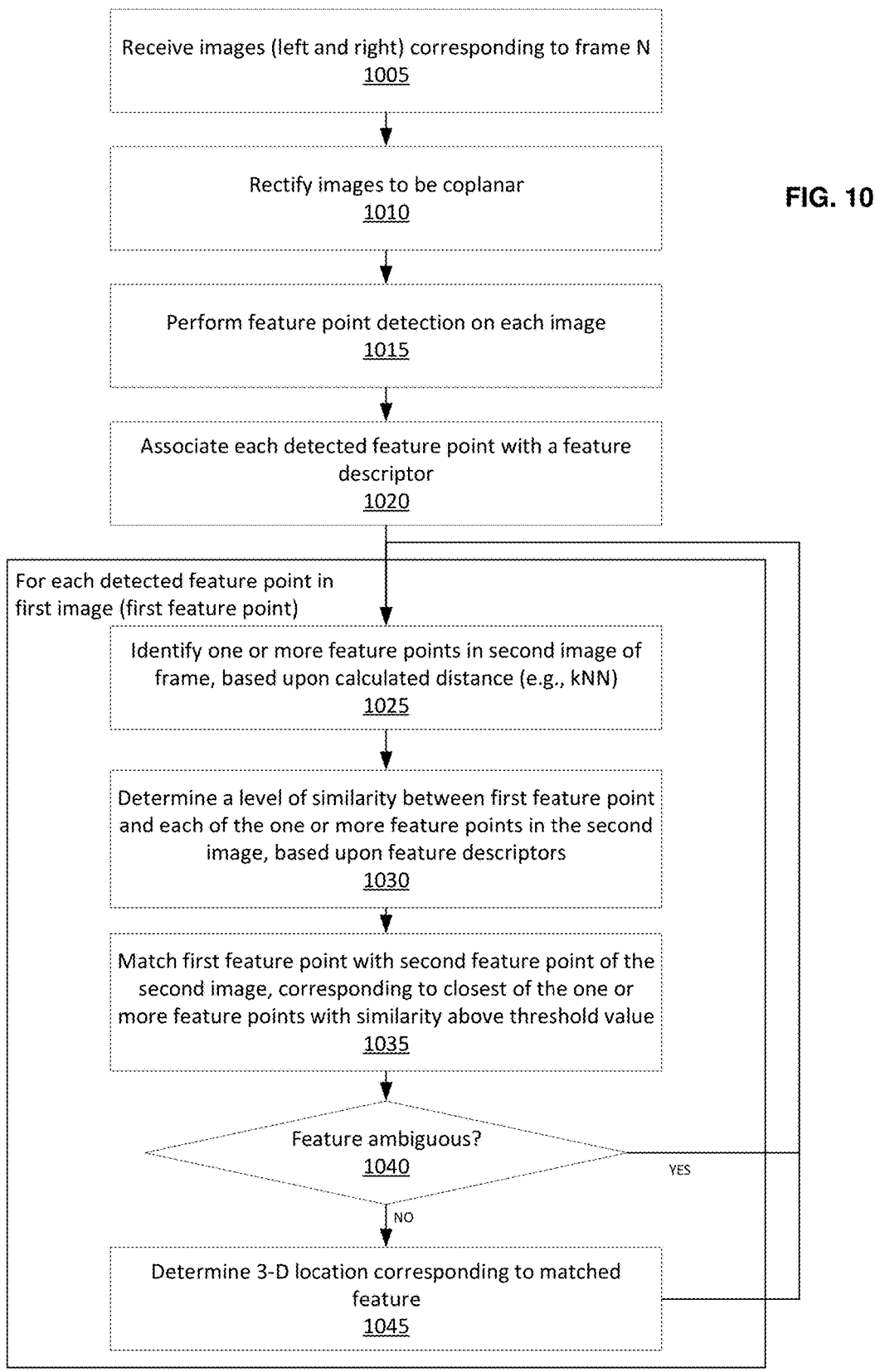
FIG. 10 is a flowchart of a process for performing feature detection on a particular frame (e.g., frame N), in accordance with some embodiments.

As discussed above, pairwise alignment may determine transformations of the pose of a vehicle between different points in time based upon determined correlations between identified features of frames corresponding to each of the different points in time. FIG. 10 is a flowchart of a process for performing feature detection on a particular frame (e.g., frame N), in accordance with some embodiments. The process for performing feature detection on a frame may be performed by the vehicle computing system (e.g., the vehicle computing system 120 illustrated in FIG. 2) associated with each vehicle. In other embodiments, one or more steps of the process may be performed by other components, such as the map creation module 410 of the HD map system 110.

The vehicle computing system receives 1005 one or more images corresponding to a particular frame N corresponding to the point in time N. In some embodiments, the frame N comprises a pair of images (e.g., a first image and a second image). In some embodiments, the first and second images may correspond to left and right images of a stereo pair.

In some embodiments, the vehicle computing system rectifies 1010 the pair of received images corresponding to the frame N. Rectification of the images functions to establish epipolar constraints between the received images of a stereo pair. In some embodiments, the images are aligned to remove non-linear distortions and to adjust for slight transitional misalignments between the cameras used to capture the images, such that each row of the pair of the images will be co-planar, ensuring that a feature point that appears in a particular row of the first image of the frame N will also be visible in the same row of the second image of the frame N.

The vehicle computing system performs 1015 feature detection on the images of frame N to identify feature points in each image. Feature points may correspond to any points within an image that are relatively distinguishable, such as edges, corners, or other identifiable physical characteristics associated with one or more objects within the local area. In some embodiments, one or more feature or corner detection algorithms are used to extract the feature points from the frame N, such as Harris Corners, SIFT features, KAZE/AKAZE, FAST, Shi/Kanade corners, and/or the like.

The vehicle computing system associates 1020 each detected feature point on the images with a feature descriptor. As used herein, a feature descriptor may correspond to a representation of data associated with a feature point that can be used to determine a level of similarity between two feature points. For example, a feature descriptor for a particular feature point may describe data around the feature point in the image. In some embodiments, a feature descriptor may indicate a type of feature point (e.g., a feature point corresponding to an edge, corner, and/or the like). In some embodiments, a feature descriptor may correspond to a Scale Invariant Feature Transform (SIFT), Speeded-up Robust Features (SURF), Dense Descriptor Applied to Wide-Baseline Stereo (DAISY), Fast Retina Keypoint (FREAK), Binary Robust Independent Elementary Features (BRIEF), Oriented FAST and Rotated BRIEF (ORB), and/or other type of feature descriptor.

Once feature points in each of the images have been identified and assigned descriptors, the vehicle computing system attempts to determine features associated with the frame N by matching up the identified feature points from the first and second images, and determining a 3-D location for each identified feature. In some embodiments, the vehicle computing system, for each detected feature point of the first image of the frame N (hereinafter referred to as the first feature point), identifies 1025 one or more feature points in the second image of the frame N, based upon a calculated distance between the location of the first feature point on the first image and the locations of each of the one or more feature points on the second image. In some embodiments, a k nearest neighbors (kNN) algorithm is used to identify k feature points of the second image that are closest to the first feature point. In some embodiments, the one or more feature points of the second image may comprise all feature points of the second image within a threshold distance of the first feature point.

The vehicle computing system determines 1030 a level of similarity between the first feature point and each of the one or more identified feature points of the second image, based upon their respective feature descriptors. For example, as discussed above, feature descriptors of different feature points may be compared to determine a level of similarity between the feature points. The feature descriptor of the first feature point is compared to the feature descriptors of each of the one or more identified feature points to determine a level of similarity between the first feature point and each of the one or more identified feature points. In some embodiments, a level of similarity between two feature points may be expressed as a number between 0.0 and 1.0, wherein levels of similarity closer to 1.0 indicate a higher amount of similarity between the feature points.

The vehicle computing system matches 1035 the first feature point with a second feature point of the one or more feature points to form a feature for the frame N, based upon the determined levels of similarity. In some embodiments, the second feature point corresponds to a feature point of the one or more feature points of the second image that is closest to the first feature point and has a level of similarity with the first feature point satisfying a threshold value. In some embodiments, the second feature point corresponds to a feature point of the one or more feature points with the highest level of similarity with the first feature point.

In some embodiments, a composite score is determined for each of the one or more feature points based upon an aggregation of distance to the first feature point and level of similarity with the first feature point, where the second feature point corresponds to the feature point having the highest composite score. In some embodiments, the level of similarity and/or composite score between the second feature point and the first feature point must satisfy a threshold level in order for the first feature point to be matched with the second feature point.

In some embodiments, the vehicle computing system may determine 1040 if the feature associated with the first feature point is ambiguous. Certain features may be considered to be ambiguous if the first feature point has sufficient similarity and/or closeness to more than one feature point of the second image. For example, in some embodiments, a feature may be ambiguous if the two closest feature points of the second image to the first feature point both have levels of similarity to the first feature point within a threshold range (e.g., between 0.7 and 0.9). In some embodiments, a feature may be ambiguous if the composite scores of two or more feature points of the second image are within a threshold range. In some embodiments, any features determined to be ambiguous are discarded.

In some embodiments, features may also be discarded if they are determined to violate one or more rules. For example, a features may be discarded if its first and second feature points do not fall on the same row within their respective images, violating the epipolar constraint imposed by the rectification of the images. In some embodiments, each first feature point on the first image may only be matched with feature points on the second image on the same row (e.g., steps 1025 through 1035 of FIG. 10). As such, the k nearest neighbors determined for a first feature point will only comprise feature points on the same row of the second image.

If the feature corresponding to the first and second feature points is determined to be not ambiguous (and is not discarded for other reasons), the vehicle computing system determines 1045 a 3-D location corresponding to the feature. The vehicle computing system may triangulate the first and second feature points using their respective 2-D locations on the first and second images and a known offset between the first and second imaging devices to determine the 3-D location of the feature.

The vehicle computing system may analyze each detected feature point of the first image as described above in relation to steps 1025 to 1045 to identify a corresponding feature point of the second image with which to form the features of the frame N, and to calculate a 3-D location for each successfully identified feature (e.g., not ambiguous or otherwise discarded).

In some embodiments, features of the frame N at certain determined 3-D locations may be discarded, in accordance with one or more predetermined rules. For example, the accuracy of the determined 3-D location of a feature decreases quadratically with distance from the imaging system. As such, features determined to have a 3-D location of beyond a threshold distance (e.g., 20 m) from the vehicle's sensor system are discarded. The threshold distance may be selected to correspond to a minimum acceptable accuracy level.

Determining 3-D Transformation in Pairwise Alignment

Figure 11:
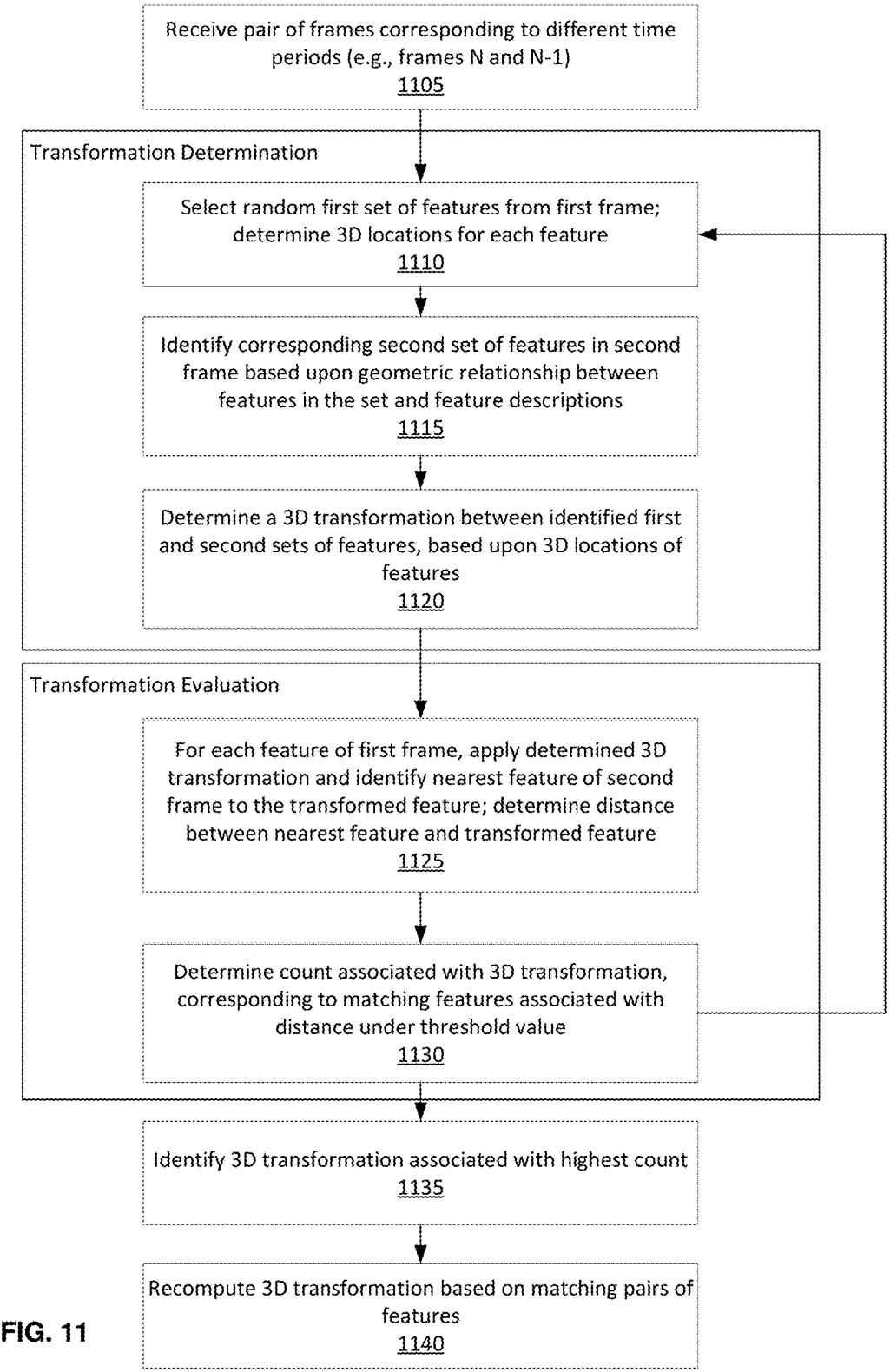
FIG. 11 is a flowchart of an example process for determining vehicle pose based upon transformation between different frames, in accordance with some embodiments.

Once the features for a received frame are determined, the determined features may be matched with features of a different frame corresponding to a different point in time (e.g., a previously received frame), such that a transformation of the pose of the vehicle between the different frames can be determined. FIG. 11 is a flowchart of an example process for determining vehicle pose based upon transformation between different frames, in accordance with some embodiments. The process for determining transformations between frames may be performed by the vehicle computing system (e.g., the vehicle computing system 120 illustrated in FIG. 2) associated with each vehicle. In other embodiments, one or more steps of the process may be performed by other components, such as the map creation module 410 of the HD map system 110.

The vehicle computing system receives 1105 a pair of frames corresponding to different time periods (e.g., frame N and frame N−1, corresponding to times N and N−1, respectively). Each of the received frames may be associated with a plurality of features, each feature corresponding to a particular 3-D location. In some embodiments, the features and their respective 3-D locations associated with each received frame may be determined using the process described in FIG. 10 above. The frame N may correspond to a currently received frame, while the frame N−1 may correspond to a previously received frame. The frame N−1 may be referred to as the first frame, and the frame N referred to as the second frame.

In some cases, the local area around the vehicle captured by the imaging system may contain features associated with objects that are not useful in determining a transformation of the vehicle between different frames (e.g., moving objects such as other vehicles). Such features may be referred to as outlier features. As such, attempting to determine a pose transformation between the frames that most closely aligns with all the identified features of the frames may result in a determined transformation that is distorted by the presence of outlier features, due to the transformation of the pose of the vehicle relative to the outlier features being different from the transformation relative to stationary features of the local area.

In order to reduce the impact of outlier features when determining the transformation of the vehicle between different frames, the vehicle computing system may evaluate multiple candidate transformations and determine a best transformation corresponding to the frames N and N−1. As such, the vehicle computing system may perform multiple iterations, each iteration comprising a transformation determination phase where a candidate transformation is determined based upon a selected sample of features from the frames N and N−1, and a transformation evaluation phase in which the determined transformation is evaluated. In some embodiments, the transformation determination phase and transformation evaluation phase may be part of a RANSAC loop.

During the transformation determination phase, the vehicle computing system selects 1110 a first set of features from the first frame (e.g., frame N−1), and determines the 3-D locations corresponding to each feature of the first set. The first set of features may be referred to as a "RANSAC basis" for performing a RANSAC loop. In some embodiments, the first set of features comprises at least three different features from the first frame. In some embodiments, the first set of features is randomly selected from the identified features of the first frame. In other embodiments, one or more constraints may be imposed on the selection of features for the first set. For example, each feature of the first set may be required to be at least a threshold distance (e.g., 2 m) from the remaining features of the set. The threshold distance may be selected to reduce a likelihood that multiple features of the first set will correspond to features on the same moving object (e.g., a car). By constraining the features of the first set to cover a relatively large area, the possibility that the features of the first set corresponding to points on a moving car or pair of cars moving at the same speed is reduced.

The vehicle computing system identifies 1115 a second set of features of the second frame (e.g., frame N) corresponding to the first set of features of the first frame. In some embodiments, the second set of features is identified based upon the geometric relationships between the locations of the second set of features. For example, the vehicle computing system determines geometric relationships between the features of the first set, and analyzes the features of the second frame to identify a second set of features that are geometrically consistent with the first set of features. In some embodiments, identification of the second set of features is optionally further be based upon feature descriptors associated with each feature of the first and second sets of features.

The vehicle computing system determines 1120 a 3-D transformation between the locations of the identified first set of features of the first frame and the corresponding locations of the second set of features of the second frame. The 3-D transformation may comprise a rigid three-dimensional transformation with six degrees of freedom. In some embodiments, the transformation may be determined using a PnP algorithm.

In some embodiments, the determined transformation is subject to an acceptance test. For example, an initial guess of the transformation of the vehicle between the points in time corresponding to the received frames may be determined and compared with the determined transformation. The initial guess may be generated based upon GPS measurements, IMU measurements, physical odometry, a combination of a plurality of sources using a Kalman filter, and/or the like. The determined transformation may be accepted only if it does not deviate from the initial guess by at least a threshold amount. Otherwise, the determined transformation may be discarded or recalculated.

The determined transformation (once accepted) may be referred to as a "candidate transformation." In some embodiments, a plurality of different candidate transformations can be determined, each corresponding to a different first set of features of the first frame and their corresponding second sets of features of the second frame. For example, different random samplings may be performed to generate one or more first sets of features of the first frame, each from which a candidate transformation can be determined. Each candidate transformation is evaluated as part of the transformation evaluation phase, in order to determine a "best" transformation that most accurately describes the motion of the vehicle between the two points in time corresponding to the first and second frames.

During the transformation evaluation phase for each candidate transformation, the vehicle computing system applies 1125 the candidate transformation to the locations each feature of the first frame to determine a transformed location of the feature, and identifies a nearest feature of the second frame to each transformed location. In addition, the vehicle computing system determines, for each feature of the first frame, the distance between the transformed location of the first frame feature and the nearest feature of the second frame.

In some embodiments, the features of the second frame are organized into a k-dimensional (k-d) tree or other type of spatial index, in order to facilitate nearest neighbor lookups. As such, a nearest neighbor feature of the second frame can be quickly determined for each transformed feature of the first frame. In some embodiments, the nearest feature of the second frame may correspond to a feature of the second frame closest to the transformed location of the feature of the first frame having a feature descriptor with a similarity level to the feature of the first frame by at least a threshold amount.

The vehicle computing system determines 1130 a count associated with the candidate transformation, based upon a number of features of the first frame that "match" with a feature of the second frame. In some embodiments, a first feature of first frame and a second feature of the second frame corresponding to the determined nearest neighbor to the first feature are determined to "match" if the distance between the transformed location of the first feature and the location of the second feature is less than a threshold amount (e.g., 20 cm). As such, each feature of the first frame may match with a feature of the second frame, or have no match on the second frame (e.g., if the closest feature on the second frame to the transformed location of the first feature has a distance over the threshold amount). The count for the candidate transformation thus corresponds to the total number of features of the first frame having a match to a feature of the second frame. In some embodiments, instead of the metric, a metric for evaluating the candidate transformation may calculated based upon the matching features of the first and second frames. For example, the metric may be based upon a volume of space covered by the locations of the matching features of the first and second frames (e.g., measured by taking a convex hull of the feature locations).

In some embodiments, distances between features may be determined based upon the locations of 2-dimensional projection of the features onto the images of the frame. For example, after the candidate transformation is applied to features of the first frame, a 2-dimensional projection of each transformed feature onto an image of the second image frame (e.g., first image of the second image frame) is determined and compared with the 2-dimensional locations of the features of the second image frame. The metric for the candidate transformation is determined based upon the distances between the 2-D projections of the transformed features of the first image frame and the 2-D locations of the corresponding features of the second image frame (also referred to as the "reprojection error"). In some embodiments, 3D-to-2D conversion of the transformed features may be used when the 3-D locations of the features are determined through triangulation, as any triangulation error may be at least partially cancelled out by the 3D-to-2D reprojection.

The vehicle computing system thus is able to determine a count or other type of metric for each determined candidate transformation, and selects 1135 a "best" candidate transformation corresponding to the candidate transformation having a highest count (or a largest volume covered). In some embodiments, the vehicle computing system may determine and evaluate a predetermined number of candidate transformations. In other embodiments, the vehicle computing system continues to determine and evaluate candidate transformations until a candidate transformation having a count or other metric exceeding a threshold value has been identified.

Once a best candidate transformation has been identified, the vehicle computing system recalculates 1140 a 3-D transformation for the first and second frames, based upon the matching features of the first and second frames. On the other hand, the features of the first frame that do not having a matching feature on the second frame may be considered outliers and not used to recalculate the 3-D transformation. In some embodiments, the 3-D transformation is recalculated by iteratively optimizing the determined candidate transformation to most closely align the matching features of the first and second frames. For example, the re-calculated 3-D transformation may be optimized to reduce a distance between the locations of the matching features of the first and second frames, based upon an error metric such as least mean squared error, least median of squares, and/or the like. The recalculated 3-D transformation thus corresponds to a 3-D transformation that most closely aligns with the matching features of the first and second frames, while ignoring the outlier features of the pair of frames. The 3-D transformation describes the changes in the pose of the vehicle between the two points in time corresponding to the first and second frames.

In some embodiments, the 3-D transformation of the vehicle is determined using an optimizer to find a best transformation that minimizes an amount of reprojection error, wherein the reprojection error is computed using the identified features of a first image of the first and second frames. For example, the reprojection error for a transformation may be determined by applying the transformation to the 3-D positions of each feature of the first frame, projecting the transformed positions of the features onto the first image of the second frame to determine a 2-D position of each transformed feature on the first image of the second frame, and determining the 2-D distance between the 2-D position of each transformed feature and the 2-D position of its corresponding feature on the second frame. The reprojection error may correspond to an aggregation (e.g., a sum) of the determined 2-D distances for each reprojected feature.

Feature Extraction in Image Regions

In some embodiments, each image of a frame may be divided into one or more different regions. Features of the images for performing pairwise alignment may be extracted from particular regions of the images. For example, certain regions of the images may correspond to regions of the local area surrounding the vehicle expected to contain features useful for performing pairwise alignment between different frames (e.g., regions less likely to contain moving objects).

When capturing images while a vehicle is moving, the forward motion of the vehicle may cause features in the image to undergo fairly large motions which manifest as large perspective warps in the captured images. Existing feature descriptors may not behave well in these situations. For example, certain techniques for matching features points between images, such as SIFT or ORB, may be unreliable under large perspective distortions, which may occur when looking at points near the vehicle in the local area while the vehicle is moving quickly in the forward direction of the imaging system. For example, the same points on different captured images may have different feature descriptors due to the perspective warp between the captured images, which may occur when a vehicle is quickly down the road, making it difficult to accurately match features across different frames.

However, feature descriptors may function well between two images that correspond to roughly the same depth in the scene, but having undergone a slight translation. For example, in general, the position of the road relative to the vehicle will remain relatively constant as the vehicle is moving (e.g., approximating a 2-D plane), with a translation corresponding to movement of the vehicle. Combined with the epipolar constraint, the first region of the images may thus allow for reliable matches for determining features and computing their 3-D locations. 3D RANSAC matching can then be reliably done between the subsequent image features to find the maximal consistent motion of points between the frames corresponding to the images.

In embodiments where the imaging system for capturing the images comprising each frame are oriented towards the front of the vehicle, each image may comprise a first region corresponding to road surface in front of the vehicle. Because the features extracted from the first region are generally expected to correspond to stationary points of the local area relative to the vehicle (e.g., points on the surface of the road), and not to moving objects, they may be used to perform pairwise alignment and to determine a transformation of the pose of the vehicle between different points in time. In some embodiments, in order to improve feature matching, the first region is extracted from the captured images, and warped in order to remove distortions due to perspective projection.

Figure 12:
FIG. 12 illustrates the first region of a captured image, in accordance with some embodiments.

FIG. 12 illustrates the first region of a captured image, in accordance with some embodiments. As illustrated in FIG. 12, the image 1200 comprises a first region 1205 corresponding to a section of roadway in front of the vehicle. The first region 1205 may be sized such that it is likely to contain identifiable features usable for pairwise alignment (e.g., lane lines), while being unlikely to contain other moving objects containing features unsuitable for use in pairwise alignment (e.g., other vehicles on the road). Due to perspective projection, the first region, while corresponding to a rectangular section of road on the local area, may appear in the image 1200 as being trapezoidal in shape.

Figure 13:
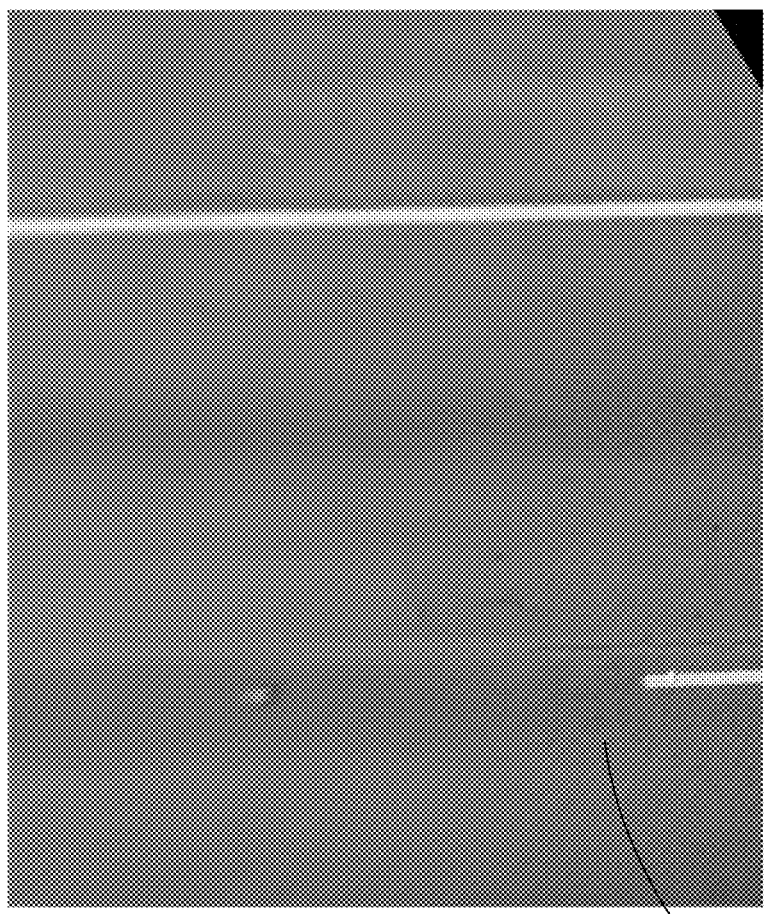
FIG. 13 illustrates a first region of a image that has been orthorectified to compensate for perspective projection, in accordance with some embodiments.

FIG. 13 illustrates a first region of a image that has been orthorectified to compensate for perspective projection, in accordance with some embodiments. The orthorectified first region 1305 illustrated in FIG. 13 may correspond to the first region 1205 of the image 1200 illustrated in FIG. 12. In some embodiments, the orthorectified first region of each image is analyzed to identify feature points (corresponding to corners, edges, and/or the like). For example, in some embodiments, feature points within the orthorectified first region 1305 may correspond to corners or edges of lane lines, features on the road (e.g., cracks, reflectors, and/or the like), etc.

The identified feature points of each orthorectified first region of the images of a frame may be used to determine features for the frame corresponding to features on the section of road in front the vehicle. In some embodiments, determining features for the frame may be performed using a process similar to that described in FIG. 10 above.

In some embodiments, a 3-D location of each feature of the frame may be determined by triangulating the locations of feature points within each of the images of the frame. In other embodiments, because the orthorectified first region is assumed to correspond to a ground plane, the 3-D location for each feature is determined without triangulation, but is instead determined based upon a position of the camera or imaging device relative to the vehicle, the ground plane normal, and a position of the feature within the image. In some embodiments, the ground plane normal is computed offline using a LIDAR scan. In other embodiments, the ground plane normal is queried online from an existing map using an estimation of the vehicle's current position, and is assumed to not change drastically over a few meters. By determining the location of the features within the first region based upon the ground plane instead of using triangulation, only one image per frame is needed. As such, in some embodiments, the imaging system of the vehicle only needs to contain a single camera capable to capturing the first region relative to the vehicle, or may contain one or more cameras that do not form stereo pairs.

Although the locations of features on the ground plane may be determined using a single image captured by a single camera, in some embodiments, images from additional cameras may be used to improve or supplement feature location determination. For example, observation of a feature on the ground plane by two cameras forming a stereo pair may be used to improve the accuracy of or improve the confidence of the determined location of the feature. In some embodiments, the stereo epipolar constraints between the images of the stereo pair may be used to improve the accuracy of the determined location of the ground plane feature. In addition, the three-dimensional locations of features not on the ground plane (e.g., outside the first region) may be determined when observed on multiple images (e.g., using triangulation).

Figure 14:
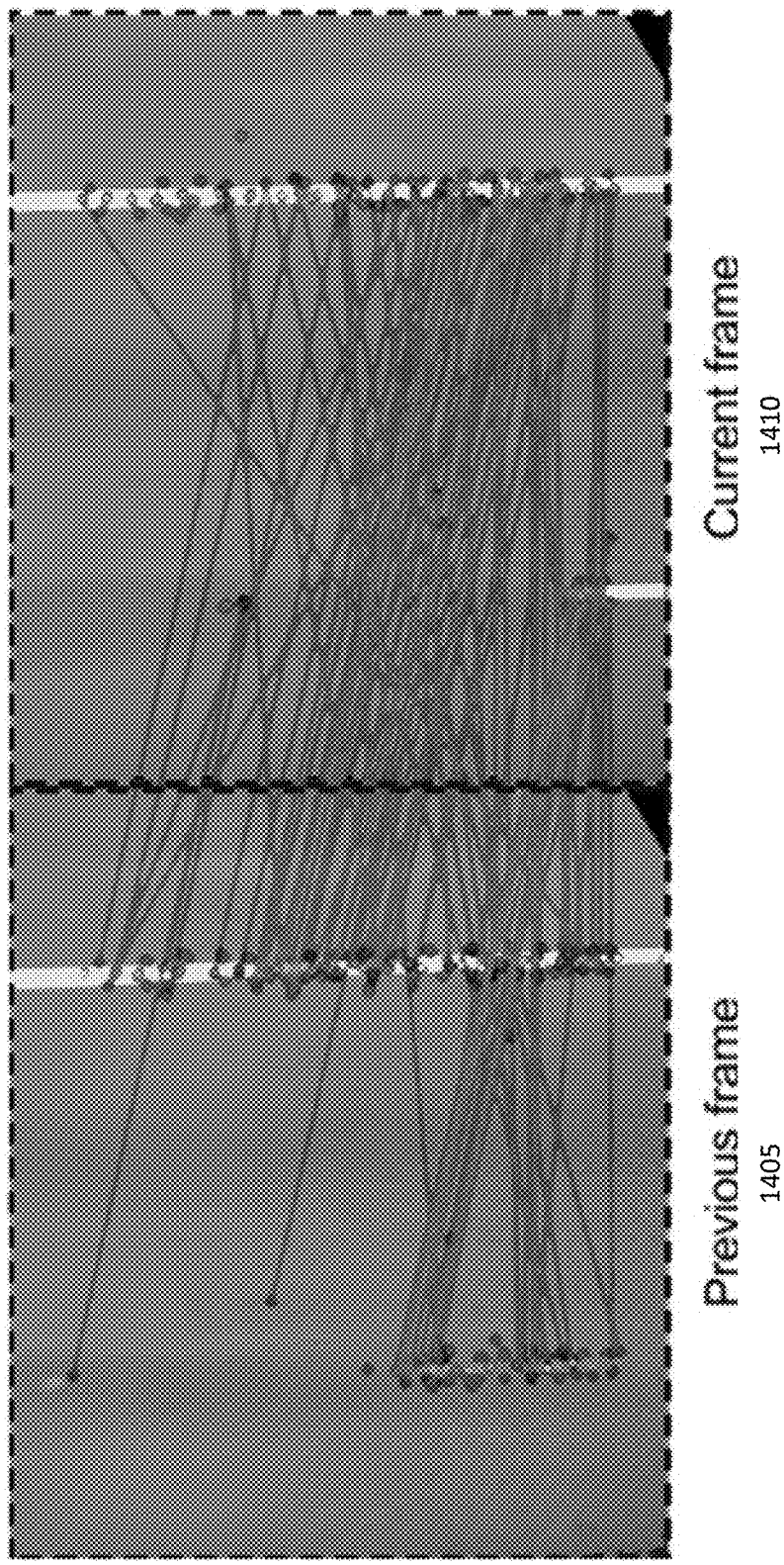
FIG. 14 illustrates a set of correspondences that may be determined between features of different frames, in accordance with some embodiments.

Once features have been determined for each of the plurality of frames, sets of features in different frames may be correlated and used to determine a transformation of the pose of the vehicle between the points in time corresponding to the different frames. FIG. 14 illustrates a set of correspondences that may be determined between features of different frames, in accordance with some embodiments. For example, in some embodiments a vehicle computing system may map the features of a first frame 1405 to those of a second frame 1410 corresponding to a different point in time. As illustrated in FIG. 14, each of the first frame 1405 and the second frame 1410 may correspond to an orthorectified region of a received frame.

Once the correspondences between the features of the different frames has been determined, a transformation of the vehicle between the frames can be calculated. In some embodiments, because the first regions of the images are typically expected to contain fewer moving objects, and as such should contain few if any outlier features, the determined transformation may correspond to a transformation that most closely aligns the features of the different frames with each other.

In other embodiments, a RANSAC and PnP loop may be used to determine transformation of the vehicle between the different frames (e.g., similar to the process described above in FIG. 11). For example, a plurality of candidate transformations may be generated based upon sampled sets of features of the first frame and a corresponding set of features of the second frame. Each of the candidate transformations is evaluated by determining a number of features of the first frame that match a feature of the second frame when transformed by the candidate transformation. The candidate transformation with the highest count or other calculated metric is selected and optimized based upon the matched features of the first and second frames.

In some embodiments, each image may further comprise a second region (not shown) corresponding to portions of the local area that are far away from the vehicle (e.g., beyond a threshold distance from the vehicle). Due to distance from the vehicle, the second region of the image may be similar to a plane, and the appearance of features within the second region may not be substantially affected by perspective projection. In some embodiments, one or more features may be determined for the second regions of each of the plurality of frames (hereinafter referred to as "distant features"). The distant features within the second region may be used in conjunction with the features of the first region to determine a transformation between the different frames.

Due to the distance of the distant features from the vehicle, if the distance of a distant feature to the vehicle changes by a few meters, its 2-D projected position on the captured images may remain substantially unchanged. As such, triangulating the features points for distant features may result in a large amount of triangulation error. Instead, the 2-D projected positions of the distant features in the images of frame are used to determine and/or evaluate transformations.

For example, in some embodiments, once correspondences between the features in the second regions of the first and second frames are determined, a determined transformation is applied to the distant features of the first frame. The transformed features are re-projected onto the second frame to determine a 2-D projected position for each transformed feature. A distance between the 2-D projected position for each transformed feature and the 2-D projected position for its corresponding distant feature on the second frame is determined and used to calculate a reprojection error (e.g., the sum of the calculated distances for each feature). By reprojecting the transformed features onto the second frame and calculating the reprojection error based upon the 2-D projected positions of the distant features, a large portion of the triangulation error may be cancelled out. In some embodiments, 3D-to-2D reprojection may also be applied to the features of the frames within the first region.

The transformation may be solved for directly using PnP techniques or by feeding a PnP algorithm 3D-to-2D correspondences of the distant features, or by using a non-linear optimizer to optimize the transformation. In some embodiments, the use of distant features in the second region may be used to optimize a rotational component for the transformation. For example, features of the first region, while sensitive to translation, may not be able to be used to accurately calculate rotation. On the other hand, the distant features of the frame are sensitive to the rotation of the vehicle, and so may be used to determine a rotational component of the transformation of the vehicle.

In some embodiments, a large portion of the captured images may be occupied by moving objects (e.g., moving cars). If a significant portion of features of the images are from moving objects, the computed transformation between frames may be relative to the moving objects instead of to stationary portions of the local area (e.g., if features on the moving objects outnumber other features, such that the features on stationary portions of the local area are considered outliers). To address this issue, pairwise alignment may be performed in conjunction with estimates of vehicle motion using IMU measurements or other mechanisms such as GPS, physical odometry, Kalman filters, and/or the like (hereinafter referred to as an "initial guess").

For example, during each RANSAC iteration in which a candidate transformation is determined, the candidate transformation is compared to the motion of the vehicle estimated by the initial guess. If the translational or rotational component of the candidate transformation differs from the initial guess by at least a threshold amount, the candidate transformation may be considered incorrect and discarded. Because in most cases the absolute motion of a vehicle is very different from its motion relative to nearby moving objects such as other moving vehicles, comparison of the candidate transformation to the initial guess motion helps to ensure that the determined transformation between the different frames corresponds to the absolute motion of the vehicle and not to motion relative to other moving vehicles.

Figure 15:
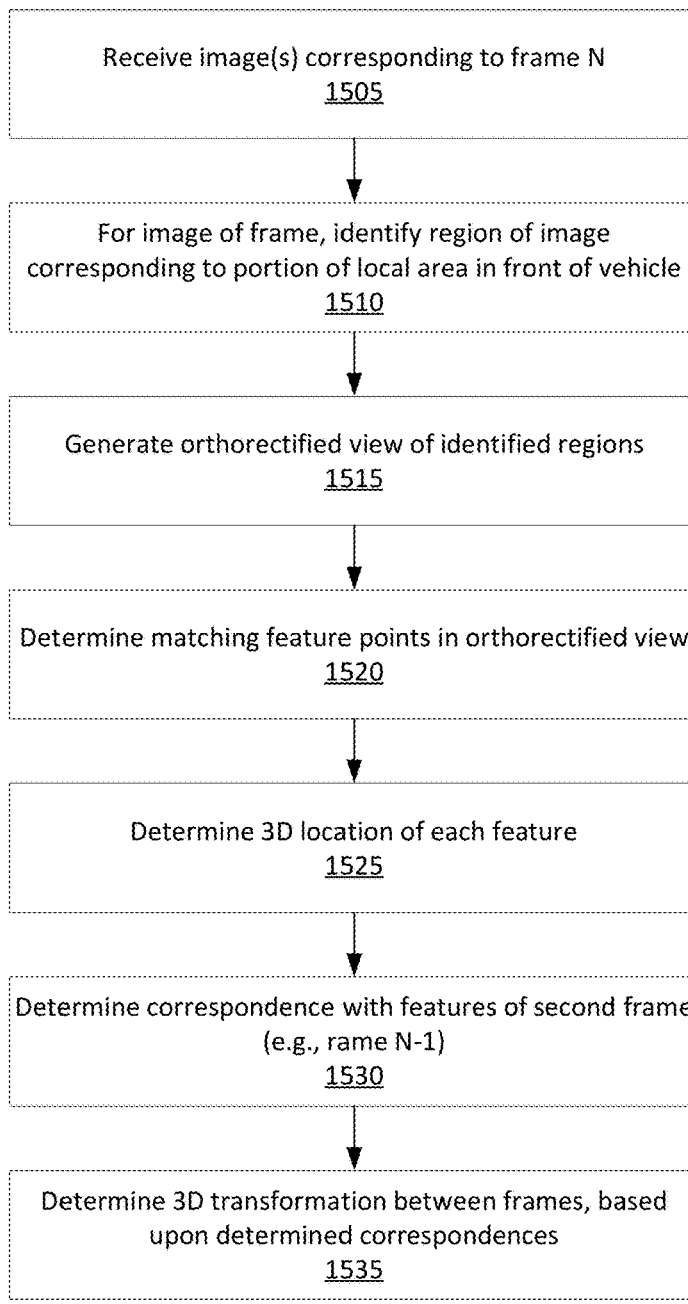
FIG. 15 is a flowchart of an example process for performing pairwise alignment, in accordance with some embodiments.

FIG. 15 is a flowchart of an example process for performing pairwise alignment, in accordance with some embodiments. The process may be performed by the vehicle computing system (e.g., the vehicle computing system 120 illustrated in FIG. 2) associated with each vehicle. In other embodiments, one or more steps of the process may be performed by other components, such as the map creation module 410 of the HD map system 110.

The vehicle computing system receives 1505 a frame corresponding to a particular point in time, the frame comprising at least a first image. In some embodiments, the first image of the frame is captured by a camera or imaging devices oriented towards the front of the vehicle, such that the image captures a portion of the local area in front of the vehicle.

The vehicle computing system identifies 1510 a region of the image corresponding to a portion of the local area in front of the vehicle. In some embodiments, the region corresponds to a section of the road in front of the vehicle. The region may be sized such that it would be expected to include features within the local area usable for performing pairwise alignment, but not include most moving objects (e.g., other vehicles).

In some embodiments, the identified region of the image may be distorted due to perspective projection. For example, the region may correspond to a rectangular area of road in front of the vehicle, but is represented on the image as being substantially trapezoidal. As such, the vehicle computing system may generate 1515 an orthorectified view of the identified region of the received image.

The vehicle computing system determines 1520 features within the identified region of the image. For example, the vehicle computing system may use one or more feature or corner detection algorithms to detect features within the orthorectified view of the region of the image.

In some embodiments where each frame comprises two or more images forming a stereo pair, the vehicle computing system determines features within each frame by matching corresponding feature points of the orthorectified views of each image. The vehicle computing system identifies feature points in each image using one or more feature detection algorithms, and determine a feature descriptor for each identified feature point. The vehicle computing system may analyze each feature point of the first image of the frame, and determine if the feature point matches a feature point of the second image of the frame, based upon a distance between the locations of the feature points in their respective images, a similarity level based upon the feature descriptors of each feature point, and/or one or more epipolar constraints. For example, an epipolar constraint may specify that feature points on the first and second image can be matched to form a feature only if they are located on the same row with the first and second images. In some embodiments, the features within each frame are identified using a process similar to that illustrated in FIG. 10 above.

The vehicle computing system determines 1525 a 3-D location of each identified feature of the frame. In some embodiments, the location of each identified feature is determined based upon a position of the camera or imaging device relative to the vehicle, the ground plane normal, and a position of the feature within the image. As such, the 3-D locations of the features are able to be determined using only a single image.

In embodiments where the frame comprises at least two images forming a stereo pair, the locations of the identified features may be determined using triangulation. In other embodiments, the stereo epipoloar constraints between the feature points of the images of the stereo pair are used to improve a confidence of feature locations determined based upon the ground plane in front of the vehicle.

The vehicle computing system determines 1530 correspondences between the features of the frame with features of a second frame (e.g., frame N−1). The correspondences between the features of each frame may be determined based upon feature descriptors associated with the features. In addition, in some embodiments, a set of features of the first frame may be determined to correspond to a set of features of the second frame based upon geometric relationships between the locations of the features within each set of features. In addition, in embodiments where the features of a frame are determined based upon matching feature points in a stereo pair, the correspondences between the features of the two different frames may be improved based upon additional information associated with the stereo feature point matching.

The vehicle computing system determines 1535 a 3-D transformation corresponding to motion of the vehicle between different points in time corresponding to the different frames, based upon the determined correspondences. In some embodiments, the 3-D transformation corresponds to a transformation that most closely aligns the locations of the features of the first frame with the locations of their corresponding features of the second frame. In some embodiments, in order to reduce an effect of outlier features (e.g., features corresponding to moving objects), one or more RANSAC iterations are performed to identify candidate transformations and evaluate each candidate transformation based upon a number of features of the first frame the candidate transformation is able to match to corresponding features of the second frame. In some embodiments, determination of corresponding features and 3-D transformations may be performed using a process similar to that described in FIG. 11. In addition, in some embodiments, the determination of the 3-D transformation may be further based upon one or more distant features in a second region of each frame, as described above.

In some embodiments, each candidate transformation may further be compared with a motion estimate generated by an IMU or other type of vehicle sensor. If the candidate transformation differs from the estimated motion by at least a threshold amount, the candidate transformation may be automatically discarded. This may be done in order to eliminate candidate transformations based upon sets of features corresponding to moving objects, shadows, and/or other types of features that would result in a different transformation being determined.

The determined transformations may be used to determine a current pose of the vehicle, in order track the position and movement of the vehicle over time. In some embodiments, the determined transformation may be used to compute dead reckoning from a previously known position in time, used to supplement a position determined using LIDAR, GPS, or IMU, and/or the like. In some embodiments, the determined position of the vehicle is used in the generation of an HD map of the local area surrounding the vehicle.

Computing Machine Architecture

Figure 16:
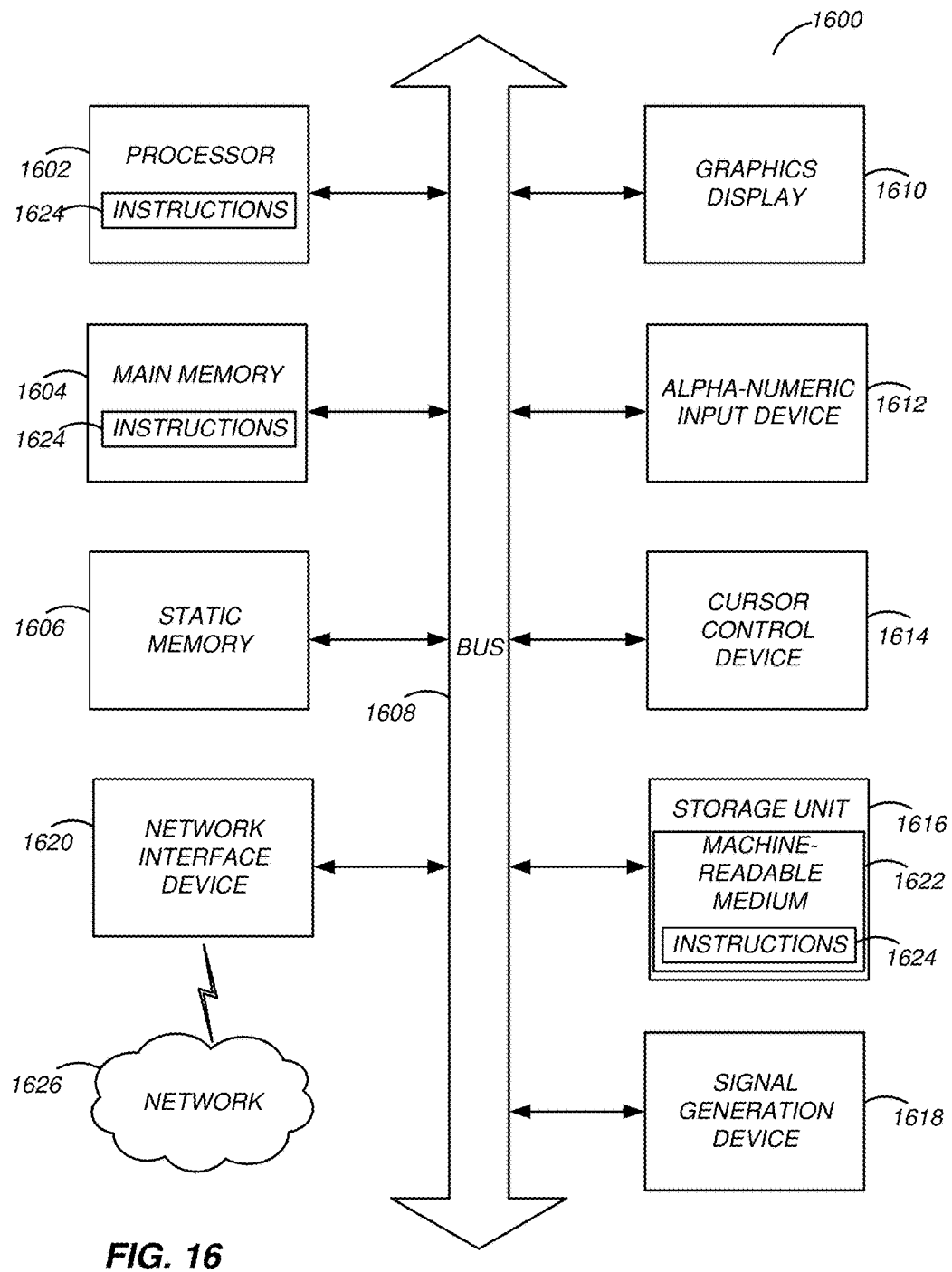
FIG. 16 illustrates an embodiment of a computing machine that can read instructions from a machine-readable medium and execute the instructions in a processor or controller.

FIG. 16 is a block diagram illustrating components of an example machine able to read instructions from a machine-readable medium and execute them in a processor (or controller). Specifically, FIG. 16 shows a diagrammatic representation of a machine in the example form of a computer system 1600 within which instructions 1624 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1624 (sequential or otherwise) that specify actions to be taken by that machine. Further, while only a single machine is illustrated, the term "machine" shall also be taken to include any collection of machines that individually or jointly execute instructions 1624 to perform any one or more of the methodologies discussed herein.

The example computer system 1600 includes a processor 1602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1604, and a static memory 1606, which are configured to communicate with each other via a bus 1608. The computer system 1600 may further include graphics display unit 1610 (e.g., a plasma display panel (PDP), a liquid crystal display (LCD), a projector, or a cathode ray tube (CRT)). The computer system 1600 may also include alphanumeric input device 1612 (e.g., a keyboard), a cursor control device 1614 (e.g., a mouse, a trackball, a joystick, a motion sensor, or other pointing instrument), a storage unit 1616, a signal generation device 1618 (e.g., a speaker), and a network interface device 1620, which also are configured to communicate via the bus 1608.

The storage unit 1616 includes a machine-readable medium 1622 on which is stored instructions 1624 (e.g., software) embodying any one or more of the methodologies or functions described herein. The instructions 1624 (e.g., software) may also reside, completely or at least partially, within the main memory 1604 or within the processor 1602 (e.g., within a processor's cache memory) during execution thereof by the computer system 1600, the main memory 1604 and the processor 1602 also constituting machine-readable media. The instructions 1624 (e.g., software) may be transmitted or received over a network 1626 via the network interface device 1620.

While machine-readable medium 1622 is shown in an example embodiment to be a single medium, the term "machine-readable medium" should be taken to include a single medium or multiple media (e.g., a centralized or distributed database, or associated caches and servers) able to store instructions (e.g., instructions 1624). The term "machine-readable medium" shall also be taken to include any medium that is capable of storing instructions (e.g., instructions 1624) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

What is claimed is:

1. A method, comprising:

receiving, from an imaging system mounted on a vehicle, a plurality of image frames, each image frame associated with a local area surrounding the vehicle at a particular point in time, and comprising a first image captured using a first camera of the imaging system and a second image captured using a second camera of the imaging system;

for each image frame of the plurality of image frames, determining locations of a set of features corresponding to features within the local area, by:

identifying a first set of feature points on the first image of the image frame, and a second set of feature points on the second image of the image frame;

assigning a descriptor for each identified feature point of the first and second sets of feature points of the image frame;

determining the set of features for the image frame, each corresponding to a feature point of the first set of feature points matched with a feature point of the second set of feature points, comprising, for a first feature point of the first set of feature points on the first image of the image frame:

identifying one or more feature points of the second set of feature points, based upon a distance between a location of the first feature point and each of the one or more feature points of the second set of feature points;

comparing the assigned descriptors of the first feature point and each of the one or more features points to determine a similarity between the first feature point and each of the one or more feature points; and in response to a determination that a similarity between the first feature point and a second feature point of the one or more feature points satisfies a threshold value, matching the first and second feature points to correspond to a feature of the set of features; and determining a location of each feature of the set of features by triangulating the corresponding feature points of the first and second set of feature points;

determining a transformation between a first position of the vehicle at a first point in time corresponding to a first image frame of the plurality of image frames, and a second position of the vehicle at a second point in time corresponding to a second image frame of the plurality of image frames, by:

selecting a first subset of features from the set of features associated with the first image frame;

identifying a second subset of features from the second image frame corresponding to the first subset of features, based upon a level of geometric similarity between the features of the first and second subsets;

using the first and second subsets of features for each of the first and second image frames, determining the transformation between the determined positions of features of the first and second subsets of features;

generating a high definition map of the local area based on the transformation, the high definition map for use in driving by one or more autonomous vehicles; and transmitting the generated high definition map to an autonomous vehicle, wherein the autonomous vehicle generates a control signal to drive the autonomous vehicle based upon the generated high definition map.

2. The method of claim 1, wherein the transformation is determined using a PnP (Perspective-n-Point) algorithm.

3. The method of claim 1, further comprising rectifying the first image and the second image of the image frame such that the first image and the second image are coplanar.

4. The method of claim 1, wherein the first and second feature points are not matched to correspond to a feature point in response to at least two of the one or more feature points having a similarity with the first feature point satisfying a threshold value.

5. The method of claim 1, wherein the first and second feature points are not matched to correspond to a feature in response to a determination that a location of the first feature point on the first image and a location of the second feature point on the second image do not correspond to the same row of the first and second images.

6. The method of claim 1, further comprising removing a feature from the set of features in response to a determination that the determined location of the feature corresponds to a distance from the imaging system exceeding a threshold distance.

7. The method of claim 1, wherein determining the transformation between the first and second positions further comprises:

for each of a plurality of iterations:

selecting a different first subset of features from the set of features associated with the first image frame;

identifying the second subset of features from the second image frame corresponding to the selected first subset of features;

determining the transformation between the determined positions of features of the first and second subsets of features;

for each feature of first image frame, applying the determined transformation to the feature and determining a nearest feature of the second image frame.

8. The method of claim 7, further comprising:

for each of the plurality of iterations, determining a count for the transformation based upon a number of transformed features of the first image frame having a nearest feature of the second image frame within a threshold distance; and identifying the transformation associated with a highest count of the plurality of iterations.

9. The method of claim 1, wherein each feature of the first subset of features is selected to be at least a threshold distance from the remaining features of the first subset of features.

10. A computer program product for generating a high definition map of a local area based upon sensor readings of a vehicle traveling through the local area, the computer program product comprising a tangible computer-readable storage medium containing computer program code that when executed causes one or more processors to:

receive, from an imaging system mounted on the vehicle, a plurality of image frames, each image frame associated with the local area surrounding the vehicle at a particular point in time, and comprising a first image captured using a first camera of the imaging system and a second image captured using a second camera of the imaging system;

for each image frame of the plurality of image frames, determine locations of a set of features corresponding to features within the local area, by:
  identifying a first set of feature points on the first image of the image frame, and a second set of feature points on the second image of the image frame;
  assigning a descriptor for each identified feature point of the first and second sets of feature points of the image frame;
  determining the set of features for the image frame, each corresponding to a feature point of the first set of feature points matched with a feature point of the second set of feature points, comprising, for a first feature point of the first set of feature points on the first image of the image frame:
    identifying one or more feature points of the second set of feature points, based upon a distance between a location of the first feature point and each of the one or more feature points of the second set of feature points;
    comparing the assigned descriptors of the first feature point and each of the one or more features points to determine a similarity between the first feature point and each of the one or more feature points; and
    in response to a determination that a similarity between the first feature point and a second feature point of the one or more feature points satisfies a threshold value, matching the first and second feature points to correspond to a feature of the set of features; and
  determining a location of each feature of the set of features by triangulating the corresponding feature points of the first and second set of feature points;
determine a transformation between a first position of the vehicle at a first point in time corresponding to a first image frame of the plurality of image frames, and a second position of the vehicle at a second point in time corresponding to a second image frame of the plurality of image frames, by:
  selecting a first subset of features from the set of features associated with the first image frame;
  identifying a second subset of features from the second image frame corresponding to the first subset of features, based upon a level of geometric similarity between the features of the first and second subsets;
  using the first and second subsets of features for each of the first and second image frames, determining the transformation between the determined positions of features of the first and second subsets of features;
generate a high definition map of the local area based on the transformation, the high definition map for use in driving by one or more autonomous vehicles; and
transmit the generated high definition map to an autonomous vehicle, wherein the autonomous vehicle generates a control signal to drive the autonomous vehicle based upon the generated high definition map.

11. The computer program product of claim 10, each feature of the first subset of features is selected to be at least a threshold distance from the remaining features of the first subset of features.

12. The computer program product of claim 10, wherein the transformation is determined using a PnP (Perspective-n-Point) algorithm.

13. The computer program product of claim 10, wherein the tangible computer-readable storage medium further contains computer program code that when executed causes one or more processors to rectify the first image and the second image of the image frame such that the first image and the second image are coplanar.

14. The computer program product of claim 10, wherein the first and second feature points are not matched to correspond to a feature point in response to at least two of the one or more feature points having a similarity with the first feature point satisfying a threshold value.

15. The computer program product of claim 10, wherein the first and second feature points are not matched to correspond to a feature in response to a determination that a location of the first feature point on the first image and a location of the second feature point on the second image do not correspond to the same row of the first and second images.

16. The computer program product of claim 10, wherein the tangible computer-readable storage medium further contains computer program code that when executed causes one or more processors to remove a feature from the set of features in response to a determination that the determined location of the feature corresponds to a distance from the imaging system exceeding a threshold distance.

17. The computer program product of claim 10, wherein the tangible computer-readable storage medium further contains computer program code that when executed causes one or more processors to determine the transformation between the first and second positions by:
  for each of a plurality of iterations:
    selecting a different first subset of features from the set of features associated with the first image frame;
    identifying the second subset of features from the second image frame corresponding to the selected first subset of features;
    determining the transformation between the determined positions of features of the first and second subsets of features;
    for each feature of first image frame, applying the determined transformation to the feature and determining a nearest feature of the second image frame.

18. The computer program product of claim 17, wherein the tangible computer-readable storage medium further contains computer program code that when executed causes one or more processors to:
  for each of the plurality of iterations, determine a count for the transformation based upon a number of transformed features of the first image frame having a nearest feature of the second image frame within a threshold distance; and
  identify the transformation associated with a highest count of the plurality of iterations.

19. A computer system for generating a high definition map of a local area based upon sensor readings of a vehicle traveling through the local area, the computer system comprising:
  one or more computer processors; and
  a tangible computer-readable storage medium containing computer program code that when executed causes one or more processors to:
    receive, from an imaging system mounted on the vehicle, a plurality of image frames, each image frame associated with the local area surrounding the vehicle at a particular point in time, and comprising a first image captured using a first camera of the imaging system and a second image captured using a second camera of the imaging system;

for each image frame of the plurality of image frames, determine locations of a set of features corresponding to features within the local area, by:
- identifying a first set of feature points on the first image of the image frame, and a second set of feature points on the second image of the image frame;
- assigning a descriptor for each identified feature point of the first and second sets of feature points of the image frame;
- determining the set of features for the image frame, each corresponding to a feature point of the first set of feature points matched with a feature point of the second set of feature points, comprising, for a first feature point of the first set of feature points on the first image of the image frame:
  - identifying one or more feature points of the second set of feature points, based upon a distance between a location of the first feature point and each of the one or more feature points of the second set of feature points;
  - comparing the assigned descriptors of the first feature point and each of the one or more features points to determine a similarity between the first feature point and each of the one or more feature points; and
  - in response to a determination that a similarity between the first feature point and a second feature point of the one or more feature points satisfies a threshold value, matching the first and second feature points to correspond to a feature of the set of features; and
- determining a location of each feature of the set of features by triangulating the corresponding feature points of the first and second set of feature points;

determine a transformation between a first position of the vehicle at a first point in time corresponding to a first image frame of the plurality of image frames, and a second position of the vehicle at a second point in time corresponding to a second image frame of the plurality of image frames, by:
- selecting a first subset of features from the set of features associated with the first image frame;
- identifying a second subset of features from the second image frame corresponding to the first subset of features, based upon a level of geometric similarity between the features of the first and second subsets;
- using the first and second subsets of features for each of the first and second image frames, determining the transformation between the determined positions of features of the first and second subsets of features;

generate a high definition map of the local area based on the transformation, the high definition map for use in driving by one or more autonomous vehicles; and transmit the generated high definition map to an autonomous vehicle, wherein the autonomous vehicle generates a control signal to drive the autonomous vehicle based upon the generated high definition map.

20. The computer system of claim 19, wherein the computer-readable storage medium further contains computer program code that when executed causes the one or more processors to determine the transformation between the first and second positions by:
for each of a plurality of iterations:
- selecting a different first subset of features from the set of features associated with the first image frame;
- identifying the second subset of features from the second image frame corresponding to the selected first subset of features;
- determining the transformation between the determined positions of features of the first and second subsets of features;
- for each feature of first image frame, applying the determined transformation to the feature and determining a nearest feature of the second image frame.

* * * * *

UNITED STATES PATENT AND TRADEMARK OFFICE
CERTIFICATE OF CORRECTION

PATENT NO. : 10,309,777 B2  
APPLICATION NO. : 15/855116  
DATED : June 4, 2019  
INVENTOR(S) : Ronghua Zhang et al.

Page 1 of 1

It is certified that error appears in the above-identified patent and that said Letters Patent is hereby corrected as shown below:

In the Claims

Column 35, Line 24, Claim 19, delete "features" and insert --feature--

Signed and Sealed this
Twenty-fifth Day of February, 2020

Andrei Iancu
*Director of the United States Patent and Trademark Office*